US008463777B2

(12) United States Patent
Tokashiki et al.

(10) Patent No.: US 8,463,777 B2
(45) Date of Patent: Jun. 11, 2013

(54) CONTENTS DISPLAY DEVICE AND CONTENTS DISPLAY METHOD

(75) Inventors: Mamoru Tokashiki, Tokyo (JP); Fujio Nobori, Kanagawa (JP); Hideo Nagasaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 233 days.

(21) Appl. No.: 12/472,599

(22) Filed: May 27, 2009

(65) Prior Publication Data

US 2009/0300004 A1   Dec. 3, 2009

(30) Foreign Application Priority Data

May 27, 2008   (JP) ................................. 2008-137396

(51) Int. Cl.
*G06F 7/00*   (2006.01)
*G06F 17/30*   (2006.01)

(52) U.S. Cl.
USPC .......................................... 707/727; 707/751

(58) Field of Classification Search
USPC .. 707/5, 727, 751; 715/835; 725/36; 345/589
See application file for complete search history.

(56) References Cited

U.S. PATENT DOCUMENTS

| 6,084,595 | A * | 7/2000 | Bach et al. ..................... 345/589 |
| 7,590,948 | B2 | 9/2009 | Narita |
| 2002/0042914 | A1* | 4/2002 | Walker et al. ................... 725/36 |
| 2007/0172131 | A1 | 7/2007 | Chosokabe |
| 2008/0163118 | A1* | 7/2008 | Wolf ............................. 715/835 |
| 2008/0295036 | A1* | 11/2008 | Ikeda et al. .................... 715/848 |
| 2009/0110300 | A1* | 4/2009 | Kihara et al. ................... 382/224 |
| 2009/0245049 | A1 | 10/2009 | Toda |

FOREIGN PATENT DOCUMENTS

| JP | 09-081574 A | | 3/1997 |
| JP | 2004-259040 A | | 9/2004 |
| JP | 2007-034663 A | | 2/2007 |
| JP | 2007-080109 A | | 3/2007 |
| JP | 2007-122496 | * | 5/2007 |
| JP | 2007-122496 A | | 5/2007 |
| JP | 2007-172702 A | | 7/2007 |

OTHER PUBLICATIONS

Askelof et al.: "Metadata-driven multimedia access", IEEE Signal Processing Magazine, Mar. 1, 2003, pp. 40-52, vol. 20, No. 2, IEEE Service Center, Piscataway, New Jersey, US.

(Continued)

*Primary Examiner* — Jacob F Bétit
*Assistant Examiner* — Christy Lin
(74) *Attorney, Agent, or Firm* — Wolf, Greenfield & Sacks, P.C.

(57) ABSTRACT

Based on a content attribute serving as a coordinate axis of which the setting input is performed from an operation input unit, and the content identifier of a content of interest, a metadata storage unit is searched to select one or multiple other contents relating to the content of interest. The strength of relationship between each of the selected other contents and the content of interest is calculated based on the content attribute set as a coordinate axis, and information indicating correlation. The layout relations of other contents with the content of interest as the origin are calculated based on the content attribute serving as a coordinate axis, and the calculated strength of relationship. The display image of each of the other contents is disposed in accordance with the calculated layout relations.

15 Claims, 27 Drawing Sheets

OTHER PUBLICATIONS

Nguyen et al.: "Interactive Search by Direct Manipulation of Dissimilarity Space", IEEE Transactions on Multimedia, Nov. 1, 2007, pp. 1404-1415, vol. 9, No. 7, IEEE Service Center, Piscataway, New Jersey, US.

Spoerri "Coordinating Linear and 2D Displays to Support Exploratory Search", IEEE Fifth Conference on Coordinated and Multiple Views in Exploratory Visualization, Jul. 1, 2007, pp. 16-26.

* cited by examiner

FIG. 3

CONTENTS INFORMATION

| content_id | title | title_image_url | synopsis | ... |
|---|---|---|---|---|
| 05127fa86e | SOUR MAN | http://cfn ... | A TIMID STUDENT ... | |
| | | | | |
| | | | | |

FIG. 4

SELECTION CRITERION

| content_id | release_time | view |
|---|---|---|
| 05127fa86e | 03-29-2006 | 5402 |
| | | |
| | | |

FIG. 5

PARAMETER LIST

| param_id | name |
|---|---|
| 1 | GENRE |
| 10 | PERFORMER |
|  |  |

FIG. 6

CONTENTS PARAMETER

| c_id | content_id | param_id | param_value |
|---|---|---|---|
| 5001 | 05127fa86e | 1 | ACTION |
| 5002 | 05127fa86e | 1 | SF FANTASY |
| 5003 | 05127fa86e | 10 | McGwire |

FIG. 7

CONTENTS CORRELATION

| r_id | content_id | next_content_id | param_id | r_point |
|---|---|---|---|---|
| 2547 | 05127fa86e | 1432de93f | 1 | 247 |
|  |  |  |  |  |
|  |  |  |  |  |

FIG. 8

ACCESS HISTORY

| ts | user_id | content_id | state (DISPLAY/ NUMBER OF SELECTIONS/ PLAYING HISTORY) |
|---|---|---|---|
| 032920 ... | f49ed39 | 05127fa86e | 1 / 10 / RATE×100 |
|  |  |  |  |
|  |  |  |  |

FIG. 9

USER PREFERENCE PARAMETER

| p_id | user_id | param_id | param_value | p_point |
|------|---------|----------|-------------|---------|
| 5757 | f49ed39 | 1 | SF FANTASY | 24 |
| | | | | |
| | | | | |

FIG. 10

CONTENT FEATURES (COORDINATES AXES) LIST

| GENRE |
|---|
| DIRECTOR |
| PERFORMERS |
| TIME (RELEASE DATE) |
| ⋮ |

FIG. 19

|  | UP-AND-DOWN KEY | RIGHT-AND-LEFT KEY | DETERMINING KEY |
|---|---|---|---|
| NORMAL MODE | CONTENT SELECTION | CONTENT SELECTION | DETAILED DISPLAY OR PLAYING OF CONTENT |
| ENLARGEMENT/ REDUCTION MODE | ENLARGEMENT/ REDUCTION | — | RETURN TO NORMAL MODE |
| PARALLEL MOVEMENT MODE | PARALLEL MOVEMENT | PARALLEL MOVEMENT | RETURN TO NORMAL MODE |

FIG. 30

ADVERTISING META DATA

| cm_id | cm_image_url | content_id1 | content_id2 | |
|---|---|---|---|---|
| | | | | |

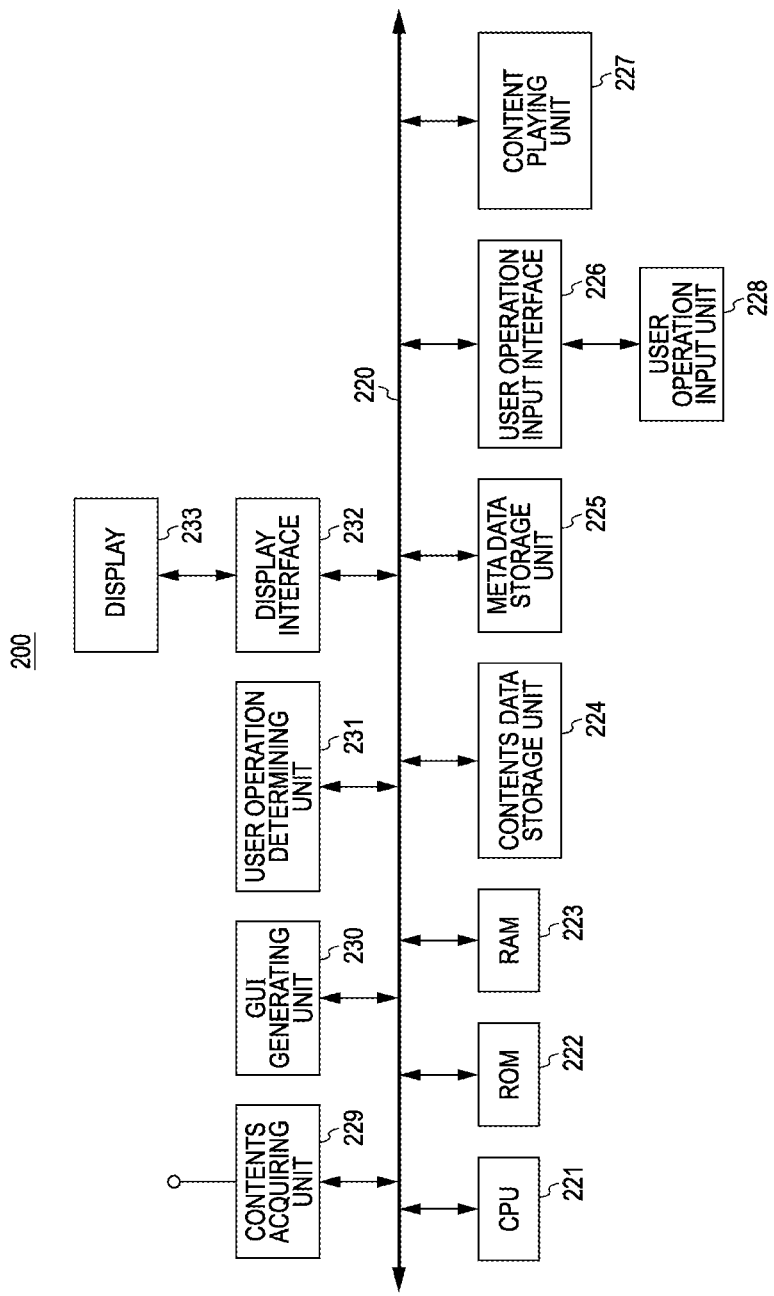

CONTENTS DISPLAY DEVICE AND CONTENTS DISPLAY METHOD

BACKGROUND OF THE INVENTION

1. Field of the Invention

The present invention relates to a contents display device and contents display method suitably employed in a case where a desired content is searched from multiple contents.

2. Description of the Related Art

As user interfaces for searching a desired content from multiple contents, in general, there have been many user interfaces wherein a keyword is input or selected, and search is performed with the keyword thereof as a searcher. With regard to a content recommendation method as to a user serving as a search result in this case, there are many methods wherein search results are displayed by being simply arrayed in a list form. This list is static display according to a user's usage history or the like.

Also, for example, Japanese Unexamined Patent Application Publication No. 2007-172702 has disclosed a method wherein static maps are generated regarding a great number of stored music contents, multiple music contents are provided, mainly around a music content of interest.

Specifically, a great number of music contents are mapped to three-dimensional coordinate space according to three types of impression items such as music speed (slow sensation versus quick sensation), tone (analog sensation versus digital sensation), and age (old sensation versus new sensation). Subsequently, if we say that one of such contents is taken as a music content of interest, music contents mapped in the vicinity thereof are also displayed as relevant recommended contents.

Also, as another example regarding how to display recommended contents, there is an example of a production content introduction page with a so-called Internet shopping site. Other relevant product contents are introduced on such a type of page along with the display image of a product content, and along with display to the effect that the person who checked this product is also checking such products.

SUMMARY OF THE INVENTION

Content search by text input or selection of a keyword leads to a problem in that it depends on the ease-of-use of the text input tool.

Also, as with Japanese Unexamined Patent Application Publication No. 2007-172702, statically displaying a recommended content fails to attract a user's interest effectively regarding the recommended content, and also results in a problem wherein it becomes difficult to avoid repetitive recommendation due to preestablished harmony.

Also, the introduction of other relevant product contents with Internet shopping shows only links where a user has checked the other products, and it is unclear how the user correlates with a content of interest. Also, it is frequently unclear from a display screen how strong a relationship the other relevant product contents have as to the content of interest.

There has been recognized demand for a contents display device and method whereby the strength of relationship between a content of interest and other contents.

According to an embodiment of the present invention, a contents display device includes: a metadata storage unit configured to store metadata including at least data for generating the display image of each content, the attribute data of each content, and data indicating the correlation with other contents for each content in a manner correlated with a content identifier; an operation input unit configured to perform setting input of a content attribute serving as a coordinate axis at the time of displaying the display images of the contents on a display screen; a contents selecting unit configured to search the metadata of the metadata storage unit based on the content attribute serving as the coordinate axis of which the setting input is performed from the operation input unit, and the content identifier of a predetermined content of interest to select one or plurality of other contents relating to the content of interest; a relation calculating unit configured to calculate the strength of relationship between each of the other contents selected by the contents selecting unit and the content of interest based on at least the content attribute set as the coordinate axis, and information indicating the correlation; a layout relation calculating unit configured to calculate the layout relations of the other contents with the content of interest as the origin based on the content attribute serving as the coordinate axis of which the setting input is performed, and the calculated strength of relationship between each of the other contents and the content of interest; and a display control unit configured to obtain the other contents selected by the contents selecting unit, and the display image data of the content of interest based on the stored data of the metadata storage unit, dispose the obtained display image of the content of interest on the origin, and dispose each of the display images of the other contents in accordance with the calculated layout relations.

With the above configuration, a content display screen is generated wherein the position of a content of interest is taken as the origin position, a content attribute of which the setting input is performed by a user is taken as a coordinate axis, and the display images of the content of interest and other contents are disposed.

Upon the content of interest being determined, and the setting input of a content attribute serving as a coordinate axis being performed, the metadata of the metadata storage unit is searched based on the content attribute serving as a coordinate axis of which the setting input is performed, and the content identifier of the predetermined content of interest, and one or multiple other contents relevant to the content of interest are selected by the contents selecting unit.

Also, the strength of relationship between each of the other contents selected by the contents selecting unit and the content of interest is calculated from at least the content attribute set as a coordinate axis, and information indicating correlation by the relation calculating unit.

Subsequently, the layout relations of the other contents with the content of interest as the origin are calculated by the layout relation calculating unit based on the calculated strength of relationship between each of the other contents and the content of interest, and the content attribute serving as a coordinate axis of which the setting input is performed.

Subsequently, according to the display control unit, the display image data of the other contents selected by the contents selecting unit, and the content of interest is obtained based on the stored data in the metadata storage unit, the obtained display image of the content of interest is disposed on the origin, and each of the display images of the other contents is disposed in accordance with the calculated layout relations.

Accordingly, the display image of each of the other contents having strong relationship regarding the content attribute of which the setting input is performed as a coordinate axis is disposed around the display image of the content of interest such that the stronger the relationship thereof is, the closer to the content of interest the display image of each of the other contents is disposed. Thus, the user can visually immediately confirm the strength of relationship regarding the content attribute of which the setting input is performed as a coordinate axis, of each of the other contents as to the content of interest. Accordingly, this becomes very effective information as a content recommendation tool.

Subsequently, according to the above configuration, if the content of interest is changed, the other contents having strong relationship regarding the changed content of interest are selected, and the display images of the content of interest and the other contents are displayed with the distance relation according to the strength of relationship. That is to say, the layout relations with the other contents vary dynamically for each content of interest.

Also, even in a case where the content attribute serving as a coordinate axis is changed, the other contents as to the content of interest vary, and the positional relation according to the strength of both relationship also varies dynamically.

According to the above configuration, the display image of each of the other contents having strong relationship regarding the content attribute of which the setting input is performed as a coordinate axis is disposed around the display image of the content of interest such that the stronger the relationship thereof is, the closer to the content of interest the display image of each of the other contents is disposed. Thus, the user can visually immediately confirm the strength of relationship regarding the content attribute of which the setting input is performed as a coordinate axis, of each of the other contents as to the content of interest.

Thus, according to the above configuration, the relationship of each of the other contents as to the content of interest can be understood visually in an intuitive manner, which is excellent as a content recommendation tool.

BRIEF DESCRIPTION OF THE DRAWINGS

FIG. 3 is a diagram for describing an example of content metadata with a contents display device according to an embodiment of the present invention;

FIG. 4 is a diagram for describing an example of content metadata with a contents display device according to an embodiment of the present invention;

FIG. 5 is a diagram for describing an example of content metadata with a contents display device according to an embodiment of the present invention;

FIG. 6 is a diagram for describing an example of content metadata with a contents display device according to an embodiment of the present invention;

FIG. 7 is a diagram for describing an example of content metadata with a contents display device according to an embodiment of the present invention;

FIG. 8 is a diagram for describing an example of content metadata with a contents display device according to an embodiment of the present invention;

FIG. 9 is a diagram for describing an example of content metadata with a contents display device according to an embodiment of the present invention;

FIG. 10 is a diagram showing examples of coordinate axes of GUI display with a contents display device according to an embodiment of the present invention;

FIG. 19 is a diagram showing the relations between user operation as to GUI and corresponding operation with a contents display device according to an embodiment of the present invention;

FIG. 30 is a diagram for describing an example of content metadata with a contents display device according to an embodiment of the present invention;

FIG. 32 is a diagram illustrating a hardware configuration example of a contents playing device making up a contents display device according to a second embodiment of the present invention.

DESCRIPTION OF THE PREFERRED EMBODIMENTS

Embodiments of the present invention regarding a contents display device and method will be described below with reference to the drawings. Note that with the present Specification, the term "contents" means content information in the form of signals, such as music, video (moved, television program, imaged image, or the like), electronic books (text information such as articles, novels, magazines or the like, and still image information), guide information, web pages, programs (including game programs and so forth), and so forth. Products sold on the Internet, such as video, text information, or the like, are also included in the term "contents".

First Embodiment

Figure 1:
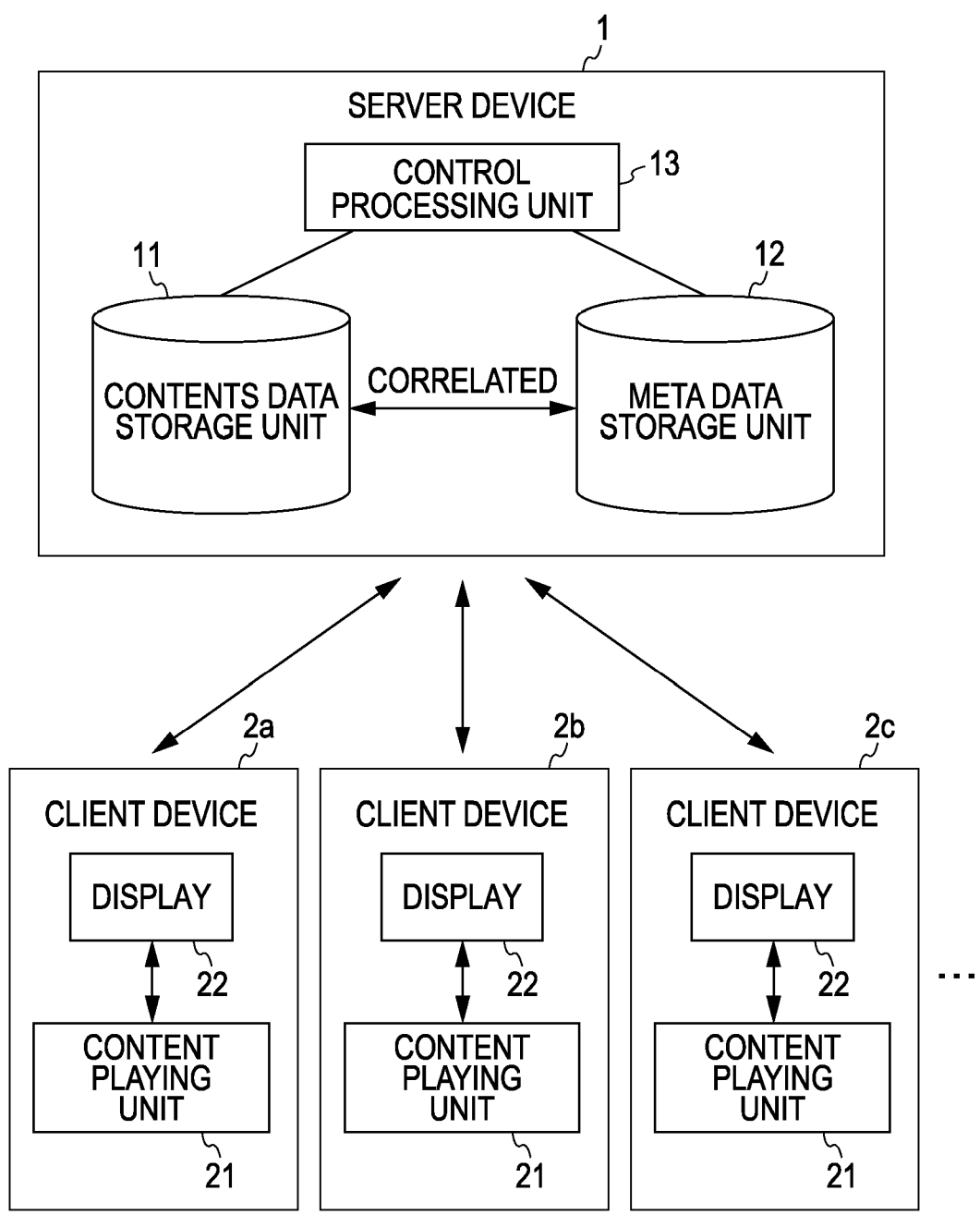
FIG. 1 is a diagram for describing the system configuration of a contents display device according to a first embodiment of the present invention.

FIG. 1 illustrates an overall configuration example of a contents display device according to a first embodiment of the present invention. The contents display device according to the first embodiment is configured of a server device 1, and multiple client devices 2a, 2b, 2c, and so on which can perform communication connection as to the server device 1 by cable or wireless. The client devices 2a, 2b, 2c, and so on each have the same configuration, so with the following description, when the client devices do not have to be, the client devices will be referred to as "client device 2".

With the first embodiment, upon the client device 2 accessing the server device 1 to request, for example, a video content, music content, or the like, the client device 2 can receive provision of the requested content data. Subsequently, the client device 2 plays the provided video content or music content for the user.

The server device 1 provides the display information of a graphical user interface (hereafter, referred to as GUI) to be employed for selecting a video content or music content which the user of the client device 2 desires.

In response to the display information of the GUI from the server device 1, the client device 2 displays a GUI screen on the display screen of a display included in the self device. The user of the client device 2 employs this GUI to select a desired content, whereby a content request can be performed as to the server device 1.

In order to satisfy the above-mentioned conditions, with the first embodiment, the server device 1 includes a contents data storage unit 11 for storing the body data of a providing content. Also, in order to generate the display information of the GUI, the server device 1 includes a metadata storage unit 12 for storing the metadata regarding a providing content. The details of metadata will be described later.

Also, the server device 1 includes a control processing unit 13 which process various types of operation instruction information or request information from the client device 2 to perform the processing according to the processing results. The control processing unit 13 includes a function for generating GUI display information, generating requested content data, and transmitting the generated GUI display information or content data to the client device 2 according to the processing results.

The client device 2 includes a content playing unit 21 for obtaining a video content or music content from the server device 1 to play this. Also, the client device 2 includes a display 22 for displaying the GUI screen obtained from the server device 1, or displaying the played video content. With the present embodiment, the client device 2 subjects the content data received from the server device 1 to streaming playing. Note that an arrangement may be made wherein the content data received from the server device 1 is stored temporarily, and this data will be played later.

Metadata for Generating a GUI

Figure 2:
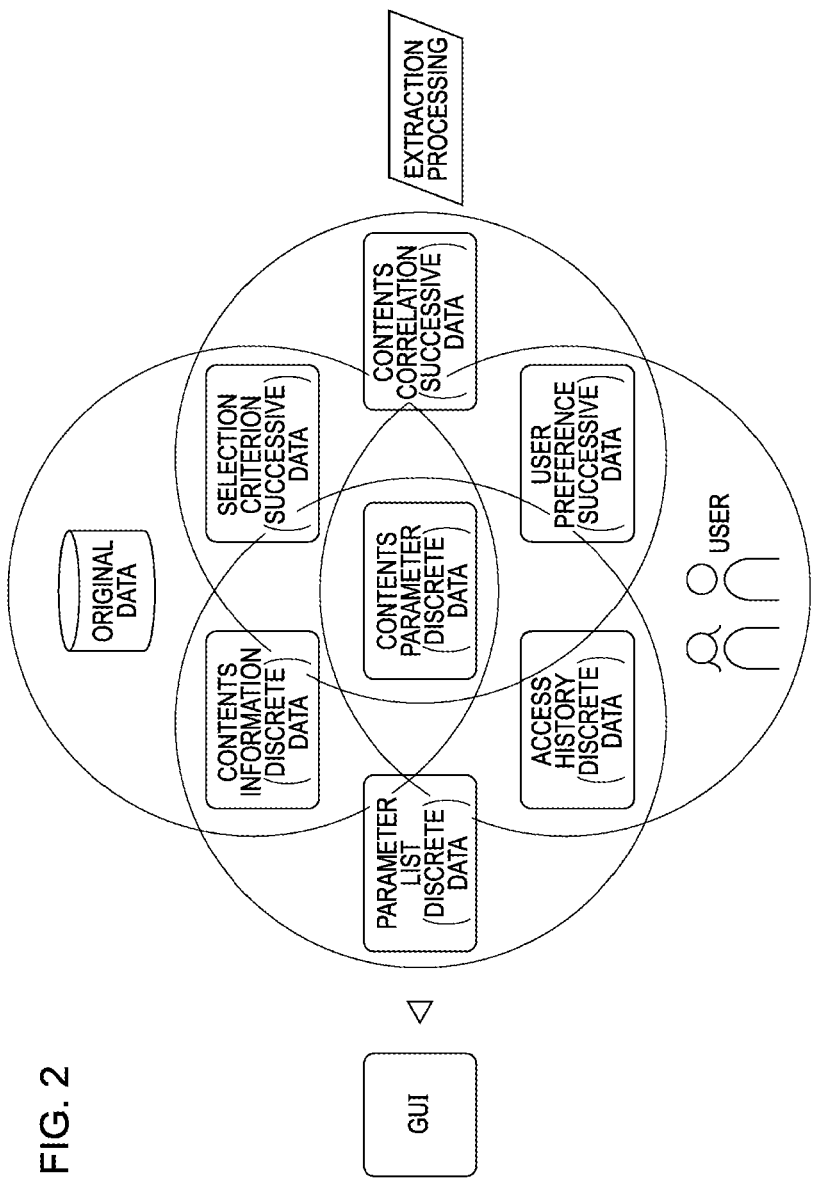
FIG. 2 is a diagram for describing an example of content metadata with a contents display device according to an embodiment of the present invention.

FIGS. 2 and 3 are diagrams for describing metadata to be stored in the metadata storage unit 12 of the server device 1. In FIG. 2, the original data means the body data of a content stored in the contents data storage unit 11, and the body data is stored in a manner correlated with the identifier of each content. The metadata is the attribute data of a content, and with this example, the metadata is made up of various data of content information, selection criteria, parameter list, contents parameters, contents correlation, access history, and user preference. Such data is stored in the metadata storage unit 12.

The content information, selection criteria, and contents parameters are metadata relating to the attributes originally included in each content itself to be stored in the contents data storage unit 11. The contents correlation, access history, and user preference are attributes to be added by the user's behavior as to a content.

The content information includes, as exemplified in FIG. 3, the identifier for each content content_id, the title of each content title, and data for generating the display image to be displayed as a GUI regarding each content. Also, the example in FIG. 3 is an example of the content information in the case of a movie content, drama content, or the like, and the data of outline synopsis is also stored in the content information.

With regard to the display image, for example, in the case of a movie content, a thumbnail image having a predetermined size made up of one scene or the like of the movie is employed in this example. In the case of a music content, a thumbnail image having a predetermined size made up of a CD (Compact Disc) jacket is employed in this example. Let us say that the size of a thumbnail image with this example is a size whereby the content of a content can be determined to some extent only by viewing the thumbnail of the display image.

With the example in FIG. 3, the data of display data of each content is stored in the storage unit. Therefore, the data for generating the display image of each content is made up of the address of memory area title_image_url where the data of the display image is stored. It goes without saying that the data for generating the display image of each content may not be such address information but the data itself of the display image.

Such content information is stored in a manner correlated with the body data by the content identifier when storing the body data of a content in the contents data storage unit 11. FIG. 3 is only one example, and various types of content attributes serving as content information may be stored.

The selection criteria are criteria when narrowing down the number of selections at the time of selecting other contents relating to a content of interest (hereafter, referred to as a target content). As exemplified in FIG. 4, the selection criteria are made up of a content identifier content_id, content release date release_time, and the number of viewings view. FIG. 4 is an example, various types of attributes serving as selection criteria may be employed. The release date of the selection criteria is stored in a manner correlated with the body data by the content identifier at the time of storing the body data of a content in the contents data storage unit 11. Also, the number of viewings is recorded based on the content selection results at the time of accessing the server device 1 from the multiple client devices 2.

The parameter list indicates a list of parameters serving as metadata of this example, and as exemplified in FIG. 5, is made up of a parameter identifier param_id, and a parameter name name such as a genre, performer, or the like. The parameter items recorded in this parameter list may be determined beforehand, or may be added when storing the body data of a content in the contents data storage unit 11.

The contents parameters records the parameters for each content, and as shown in FIG. 6, an identifier for processing c_id, content identifier content_id, parameter identifier param_id, and parameter value param_value are recoded as one set.

As the parameter value param_value, with the example in FIG. 6, "action" and "SF fantasy" which are further lower layer parameter values of a lower layer segment "movie" of a parameter name "genre", a particular performer name which is a lower segment of a parameter name "performer" is recorded. The parameter values "action" and "SF fantasy" are lower layer parameter values of the parameter name "genre", so with regard to this content, "1" indicating the parameter name "genre" is recorded as the parameter identifier param_id. Also, with regard to the content wherein a particular performer name is recorded as a parameter value, the particular performer name is the lower layer parameter value of the parameter name "performer", so "10" indicating the parameter name "performer" is recorded as the parameter identifier param_id.

Note that, as shown in FIG. 6, multiple sets of contents parameters may be recorded as to the same content. These contents parameters are also stored in a manner correlated with the body data by the content identifier when storing the body data of the content in the contents data storage unit 11.

The contents correlation indicates, with this example, recording of a content selected next for each content, and represents the correlation between contents by selection of a content. With the example in FIG. 7, an identifier for processing r_id, a content identifier content_id, the identifier of a content selected next next_content_id, the parameter identifier of the next content param_id, and the number of times of selection of the next content r_point are recorded as one set. The parameter identifier of the next content param_id indicates by what relation with the target content the next content is selected.

This contents correlation is recorded based on the content selection results at the time of accessing the server device 1 from the multiple client devices 2. This contents correlation is also an example, and in a case where there is a content which is the subsequence of a certain movie content, the subsequent content may be recorded.

The access history indicates an access history (including a currently accessing state) as to a content of the server device 1 by each user of the multiple client devices 2. With the example in FIG. 8, the access history is made up of access point-in-time ts, user identifier user_id, content identifier content_id, and access state state.

The access point-in-time ts is represented with year-mothday-hour-minute-second. The access state is, in the case of a movie content, made up of display/selections/played time. The "display" indicates whether or not the content is currently displayed (played), and in a case where the field value thereof is "1" this indicates that the content is currently displayed (played), and in a case where the field value thereof is "0" this indicates that the content is not displayed (currently not played). The "selections" indicate the number of selected times. The "played time" indicates what percentage of the total has been played by the field value thereof. Note that the user identifier user_id is registered as to the server device 1 when the user of the client device 2 accesses the server device 1 for the first time. Note that the access history is recorded as real-time and past history based on the access sate of the content of the server device 1 from the multiple client devices 2.

The user preference indicates the preference information of contents selection regarding each user of the multiple client devices 2. FIG. 9 shows an example of this user preference information. With the example in FIG. 9, the user preference is made up of an identifier for processing p_id, user identifier user_id, parameter identifier param_id, parameter value param_value, and the number of times p_point. The number of times p_point is, with this example, the number of times of content selections determined with the parameter identifier param_id and parameter value param_value.

This user preference is updated when access to the server device 1 regarding each user is completed. FIG. 9 is an example of the user preference, and the user preference employing other metadata may also be recorded. GUI to be generated With the present embodiment, the server device 1 employs the above-mentioned metadata to generate a GUI serving as a content selection auxiliary tool with the client device 2. The GUI according to the present embodiment disposes, when taking a certain content as the target content, the other contents relating to the target content around the target content to display these.

With the present embodiment, an arrangement is made wherein the user can perform setting input regarding whether to dispose other contents having what kind of relation as to the target content. Subsequently, with the present embodiment, keywords for determining the relationship between the target content and each of the other contents are the above-mentioned content attributes included in metadata.

With the present embodiment, the server device 1 includes a content attribute list generated from the metadata stored in the metadata storage unit 12, of which the setting input can be performed by the user, and provides this to the user of the client device 2. An example of this content attribute list is shown in FIG. 10. With the present Specification, content attributes serving as keywords for determining the above-mentioned relationship will be referred to as content features.

The client device 2 selects a content feature desired to be correlated with the target content from the content feature list. The content feature to be selected may be one, but with the present embodiment, multiple content features may be selected. In a case where multiple content features have been selected, with regard to the relationship with the target content, not only the relationship peculiar to each content feature but also the relationship with the target content regarding the selected multiple content features are represented with the GUI.

The target content is also selectively set by the user. For example, with a portal page when the client device 2 accesses the server device 1, the target content can be selected. In this case, when the server device 1 prepares for a programming guide such as EPG (Electronic Programming Guide) or the like, the user of the client device 2 can selectively specify the target content from the programming guide. Also, if the client device 2 is accessing the server device 1, and a predetermined content is being played, the played content is taken as the target content.

Upon the setting input of keywords which determine the relationship between the target content and each of the other contents being performed to determine the target content, the server device 1 selectively extracts other contents relevant to the target content by employing the metadata of the metadata storage unit 12. At this time, the number of contents to be selectively extracted is restricted by employing the metadata (parameter data) of the selection criteria. Specifically, for example, a content of which the release date release_time is closer to that of the target content is prioritized, and also a content of which the number of viewings view is greater is prioritized, thereby restricting the number of contents to be selectively extracted to a predetermined number or less. Such a restriction is performed for displaying the display image of a content with a size whereby the user can readily understand the content of the content, and with little overlapping as less as possible when displaying the GUI on the limited region of the display screen.

The server device 1 calculates the layout relations regarding the other contents thus selectively extracted with the target content as the center in the following manner.

When calculating the layout relations, with the GUI according to the present embodiment, let us say that the position of the target content is set to the origin, and the content features of which the setting input is performed are set to coordinate axes. Subsequently, let us say that the strength of relationship between the target content and each of the other contents is represented with distance between the display image of the target content and each of the display images of the other contents. Subsequently, let us say that the display image of the target content, and the display images of the other contents are disposed in a map manner based on the determined layout relations to generate a GUI.

Now, the strength of relationship between the target content and each of the other contents is, with this example, calculated as follows. In a case where the content features of which the setting input is performed include a lower layer attribute such as a genre or the like, the content which is identical to the target content with a lower attribute is determined as strong relationship. For example, when the target content is a content relating to a soccer game, the other contents relating to the same soccer game are determined as strong relationship, and the other contents simply relating to a genre of sports are determined as weak relationship.

Also, with the present embodiment, when determining the strength of relationship, the contents correlation is taken into consideration. Specifically, the content selected following the target content is determined as relatively strong relationship, and also the greater the number of times of selections thereof is, the content thereof is determined as stronger relationship.

Also, with the present embodiment, the user preference is also taken into consideration when determining the strength of relationship. Specifically, let us say that the metadata of the user preference is referenced, the other contents having an attribute indicating the user preference are determined as strong relationship with the target content. The user preference mentioned here may include the user preference of another user along with the user preference of a user who attempts to employ the GUI (hereafter, referred to a GUI utilizing user).

Figure 11:
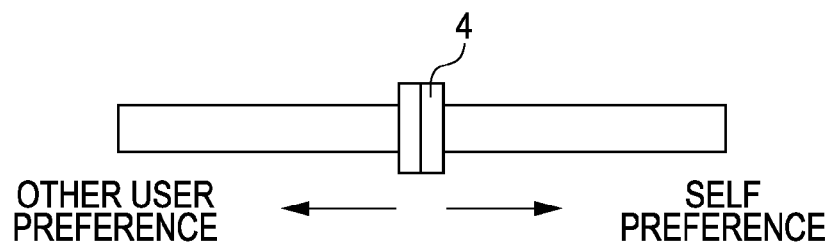
FIG. 11 is a diagram employed for describing GUI display with a contents display device according to an embodiment of the present invention.

For example, an arrangement may be made wherein slide-type operating tool 4 such as shown in FIG. 11 is provided, the user can set whether to reflect the user own preference and another user's preference on the strength of relationship between the target content and each of the other contents with what kind of proportion. It goes without saying that only the user own preference or only another user's preference may be reflected on the strength of relationship with other contents by the slide-type operating tool 4. Note that the slide-type operating tool 4 may be set to a portion of the GUI by being displayed on the display screen of the display.

Incidentally, in a case where only one content feature serving as a coordinate axis has been selected, the display images of the other contents may be disposed along the coordinate axis direction in a linear or curved shape in accordance with the strength of relationship as to the target content. That is to say, the stronger the other content has relationship with the target content, the closer to the display image of the target content the image of the other content thereof should be displayed.

Figure 12:
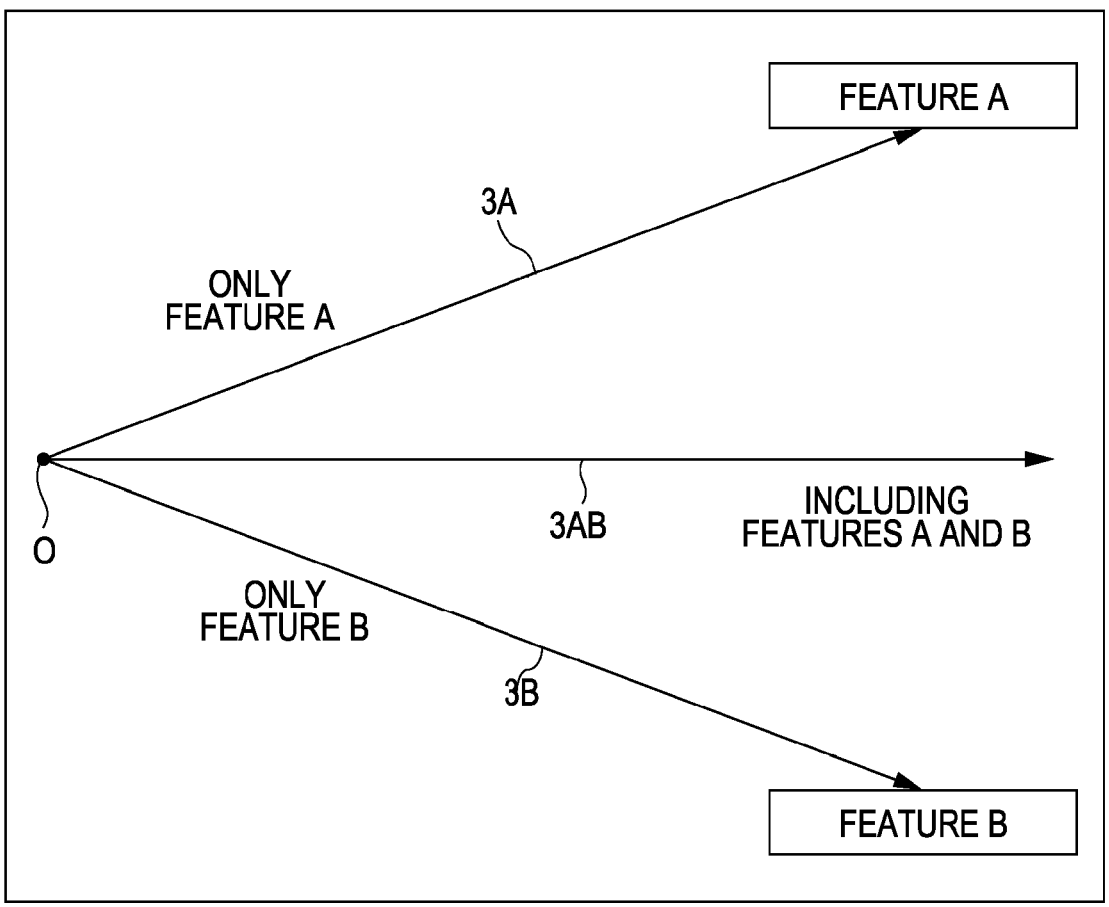
FIG. 12 is a diagram illustrating an allocation example of the coordinate axes of GUI display with a contents display device according to an embodiment of the present invention.

In a case where two or more content features serving as coordinate axes have been selected, for example, the following layout is made. For example, in a case where two of features A and B have been selected as the content features serving as coordinate axes, with this example, layout relations such as shown in FIG. 12 are determined. Specifically, with the example in FIG. 12, an origin position O is set at the center on the left side of the display screen. Subsequently, in FIG. 12, the coordinate axis 3A of the feature A is assumed in the direction toward the upper right from the origin position O, shown in arrow 3A. Also, the coordinate axis 3B of the feature B is assumed in the direction toward the lower right from the origin position O, shown in arrow 3B.

In the case of FIG. 12, with the GUI, the display image of the target content is displayed on the origin position O, and the display images of the other contents having the relationship with the target content regarding the feature A alone are arrayed along the arrow 3A. Also, the display images of the other contents having the relationship with the target content regarding the feature B alone are arrayed along the arrow 3B. Subsequently, the stronger the other content has relationship with the target content, the closer to the display image of the target content the image of the other content thereof is disposed.

The display images of the other contents having the relationship with the target content regarding both of the features A and B are displayed in a region sandwiched between the arrows 3A and 3B in accordance with the strength of the relationship. Specifically, of the other contents having the relationship with the target content regarding both of the features A and B, the display images of the other contents having stronger relationship as to the feature A are displayed on positions closer to the arrow 3A. Also, of the other contents having the relationship with the target content regarding both of the features A and B, the display images of the other contents having stronger relationship as to the feature B are displayed on positions closer to the arrow 3B.

If the features A and B are binary features whether or not a content includes as an attribute, for example, such as a performer name, the display images of the other contents are arrayed in a direction shown in arrow 3AB which is in the equal distance from the arrows 3A and 3B.

Note that the coordinate axis directions shown in the arrows 3A and 3B are imaginary directions not displayed with the display of the GUI. However, what are content features serving as coordinate axes are informed to the user by the content feature names being displayed such as shown in the upper right and lower left in FIG. 12. That the coordinate axis directions are not displayed, and content feature names are displayed, is also true of the following other multiple coordinate axes GUI.

Figure 13:
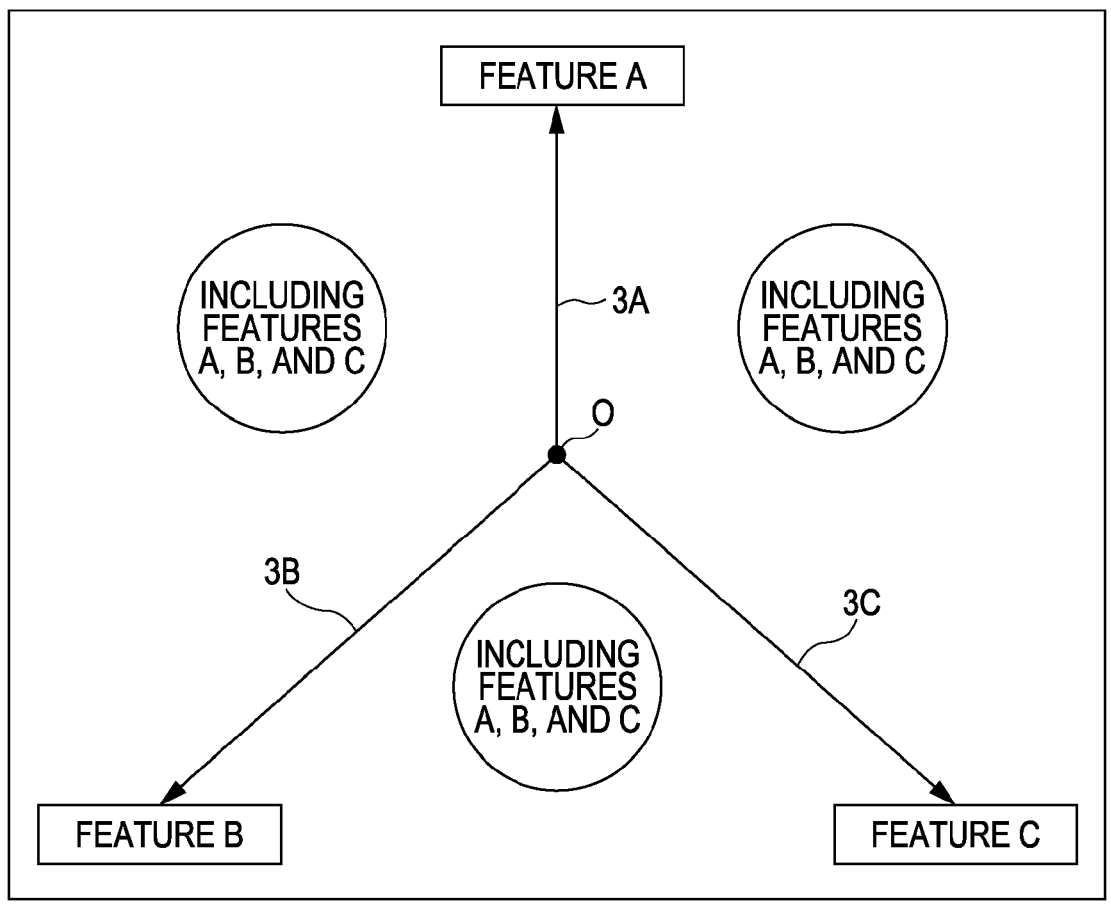
FIG. 13 is a diagram illustrating an allocation example of the coordinate axes of GUI display with a contents display device according to an embodiment of the present invention.

Also, in a case where three of features A, B, and C have been selected as content features serving as coordinate axes, with this example, layout relations such as shown in FIG. 13 are determined. Specifically, with the example in FIG. 13, the origin position O is set at the center of the display screen.

Subsequently, in FIG. 13, the coordinate axis 3A of the feature A is assumed in the upward direction from the origin position O. Also, the coordinate axis 3B of the feature B is assumed in the direction toward the lower left from the origin position O, shown in arrow 3B. Further, the coordinate axis 3C of the feature C is assumed in the direction toward the lower right from the origin position O, shown in arrow 3C.

In the case of FIG. 13, with the GUI, the display image of the target content is displayed at the center which is the origin position O. Subsequently, the display images of the other contents having the relationship with the target content regarding the feature A alone, feature B alone, or feature C alone are arrayed along the arrows 3A, 3B, and 3C, respectively. Subsequently, the stronger the other content has relationship with the target content, the closer to the display image of the target content the image of the other content thereof is disposed.

In the case of the three-coordinate axes, the three features are all adjacent. Therefore, the display images of the other contents according to the strength of the relationship with the target content regarding the three features are displayed on a region sandwiched between the arrows 3A and 3B, a region sandwiched between the arrows 3A and 3C, and a region sandwiched between the arrows 3B and 3C. That is to say, even with a region sandwiched between two coordinate axes, the display images of the other contents are displayed on not a position according to the strength of relationship with the target content regarding the two features serving as the two coordinate axes but a position according to the strength of relationship regarding the three features.

Figure 14:
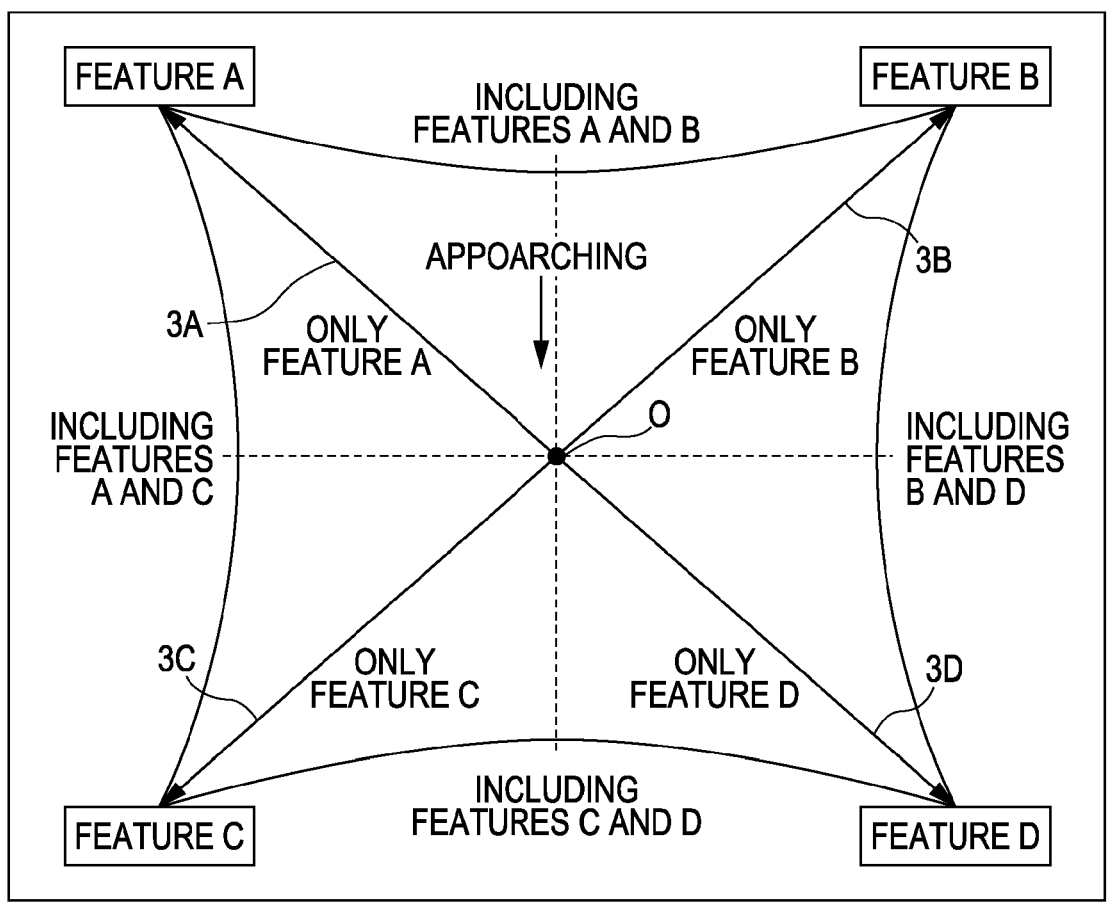
FIG. 14 is a diagram illustrating an allocation example of the coordinate axes of GUI display with a contents display device according to an embodiment of the present invention.

Also, in a case where four of features A, B, C, and D have been selected as content features serving as coordinate axes, with this example, layout relations such as shown in FIG. 14 are determined. Specifically, with the example in FIG. 14, the origin position O is set at the center of the display screen.

Subsequently, in FIG. 14, the coordinate axis 3A of the feature A is assumed in the direction toward the upper left from the origin position O, shown in arrow 3A. Also, the coordinate axis 3B of the feature B is assumed in the direction toward the upper right from the origin position O, shown in arrow 3B. Also, the coordinate axis 3C of the feature C is assumed in the direction toward the lower left from the origin position O, shown in arrow 3C. Further, the coordinate axis 3D of the feature D is assumed in the direction toward the lower right from the origin position O, shown in arrow 3D.

In the case of FIG. 14, with the GUI, the display image of the target content is displayed at the center which is the origin position O. Subsequently, the display images of the other contents having the relationship with the target content regarding the feature A alone, feature B alone, feature C alone, or feature D alone are arrayed along the arrows 3A, 3B, 3C, and 3D, respectively. Subsequently, the stronger the other content has relationship with the target content, the closer to the display image of the target content the image of the other content thereof is disposed.

In the case of the example assuming the four coordinate axes, with the features A and D, and features B and C, wherein both pairs are disposed in the diagonal positions, the coordinate axes are not adjacent, so expression of correlation is not available regarding both pairs. Therefore, in the case of the example in FIG. 14 assuming the four coordinate axes, on a region sandwiched between the adjacent two coordinate axes the images of the other contents having the relationship regarding content features serving the two coordinate axes are displayed according to the strength of relationship with the target content.

For example, the display images of the other contents having relationship regarding the target content and both of the features A and B are displayed on positions according to the strength of relationship in a region sandwiched between the arrows 3A and 3B. This is also true of the other features.

Note that, with the example assuming the four coordinate axes, the coordinate axis positions are changed so as to be adjacent to the features of nonadjacent coordinate axes, thereby changing a GUI to be generated. For example, with the example in FIG. 14, the positions of the features B and D are switched vertically, thereby generating different GUI display.

In a case where five or more content features serving as coordinate axes are assumed, similar to the example in FIG. 14, the origin position O is set to the center of the display screen, the five or more coordinate axes are set in five or more directions which are equally divided by the number of features in the circumferential direction. Subsequently, on a region sandwiched between the adjacent two coordinate axes the display images of the other contents having relationship regarding the content features serving as the two coordinate axes are displayed according to the strength of relationship with the target content.

Note that, even with an example assuming five or more coordinate axes, the coordinate axis positions are changed so as to make the features of nonadjacent coordinate axes adjacent, thereby generating a different GUI.

Specific Display Example of GUI

Figure 15:
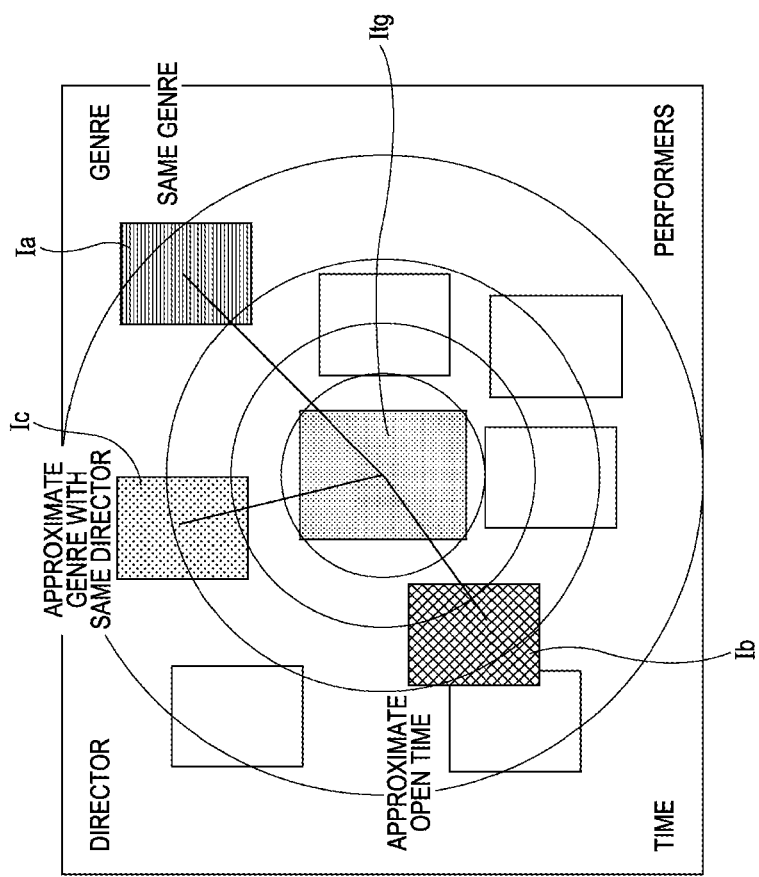
FIG. 15 is a diagram illustrating a display example of GUI with a contents display device according to an embodiment of the present invention.

FIG. 15 illustrates a display example of a GUI in a case where the setting input of four content features "genre", "director", "performers", and "time" has been performed as coordinate axes, which is a GUI for movie contents. With the GUI of the example in FIG. 15, squares indicate the display images of contents. Though omitted in FIG. 15, with the display images illustrated in squares, one scene of a movie, advertising scene, title, and so forth are displayed, whereby the user can understand the outline of a content only by viewing the display images.

The display image Itg of the target content is displayed greater than the display images of the other contents at the center of the display screen, whereby the display image of the target content can be distinguished from the images of the other contents. In order to inform the display image Itg of the target content, various types of display mode may be employed such that the target content is surrounded with a solid frame, the brightness of the target content is made brighter than the other contents, or the like, other than that the size of the target content is changed from the sizes of the other contents.

From the display position of the display image Ia of the other content of the GUI in FIG. 15, the other content can be determined as a content having the same genre as the target content. Also, from the display position of the display image Ib of the other content, the other content can be determined as a content of which the release date (release day) is close to the target content. Further, from the display position of the display image Ic of the other content, the other content can be determined as a content of which the director is the same as the target content, and of which the genre is close to the target content.

Parallel Movement and Enlargement/Reduction of GUI

With the present embodiment, as described above, with the GUI, around the display image of the target content the display images of the other contents relating to the target content are disposed in a map manner. With the present embodiment, parallel movement and enlargement/reduction may be performed with this GUI map.

As described above, when creating a GUI, upon the target content being determined, and the coordinate axes being determined, the other contents relating to the target content to be displayed as the GUI are selected first. Subsequently, the layout positions of the selected other contents as to the target content are determined from the distance positions according to the strength of relationship as to the target content, and the position relation as to the coordinate axes. This becomes the entire map information regarding a certain target content to be displayed as the GUI.

Figure 16:
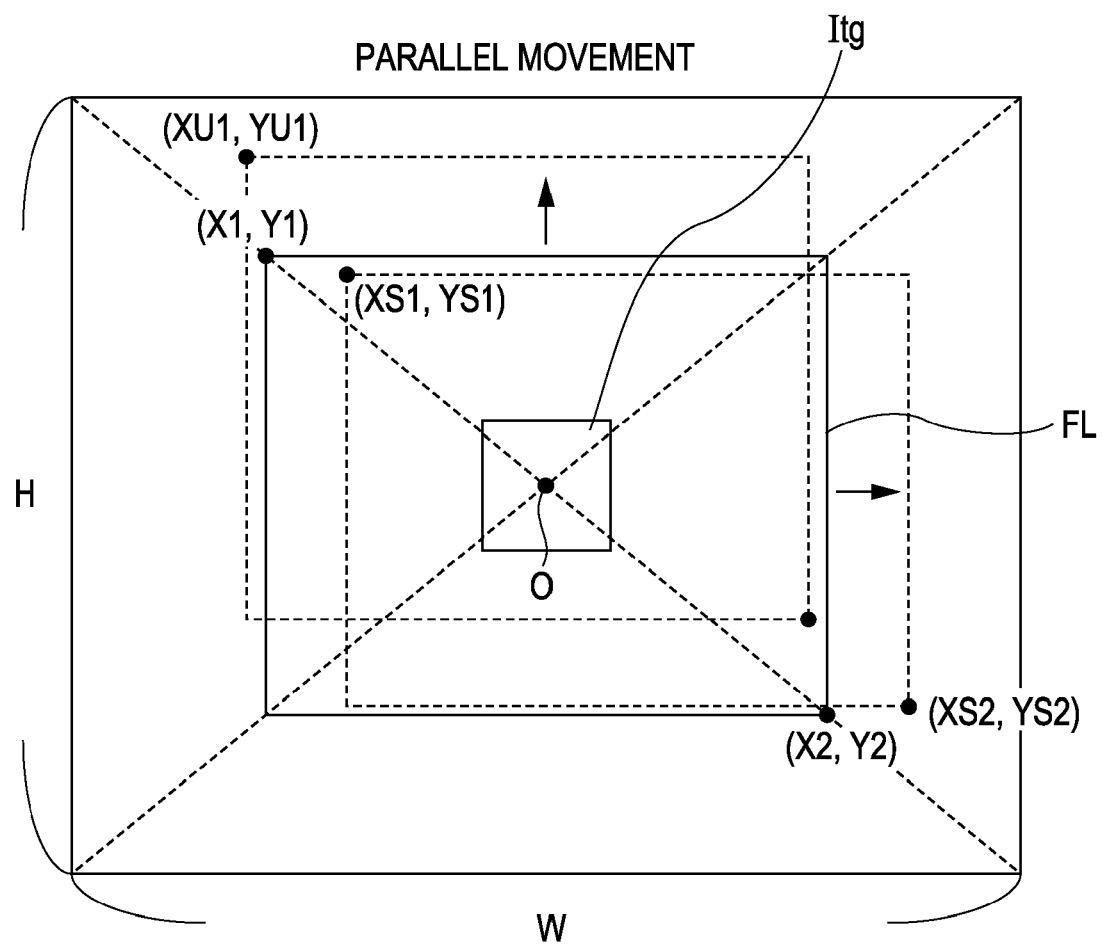
FIG. 16 is a diagram for describing parallel movement mode of GUI with a contents display device according to an embodiment of the present invention.
Figure 17:
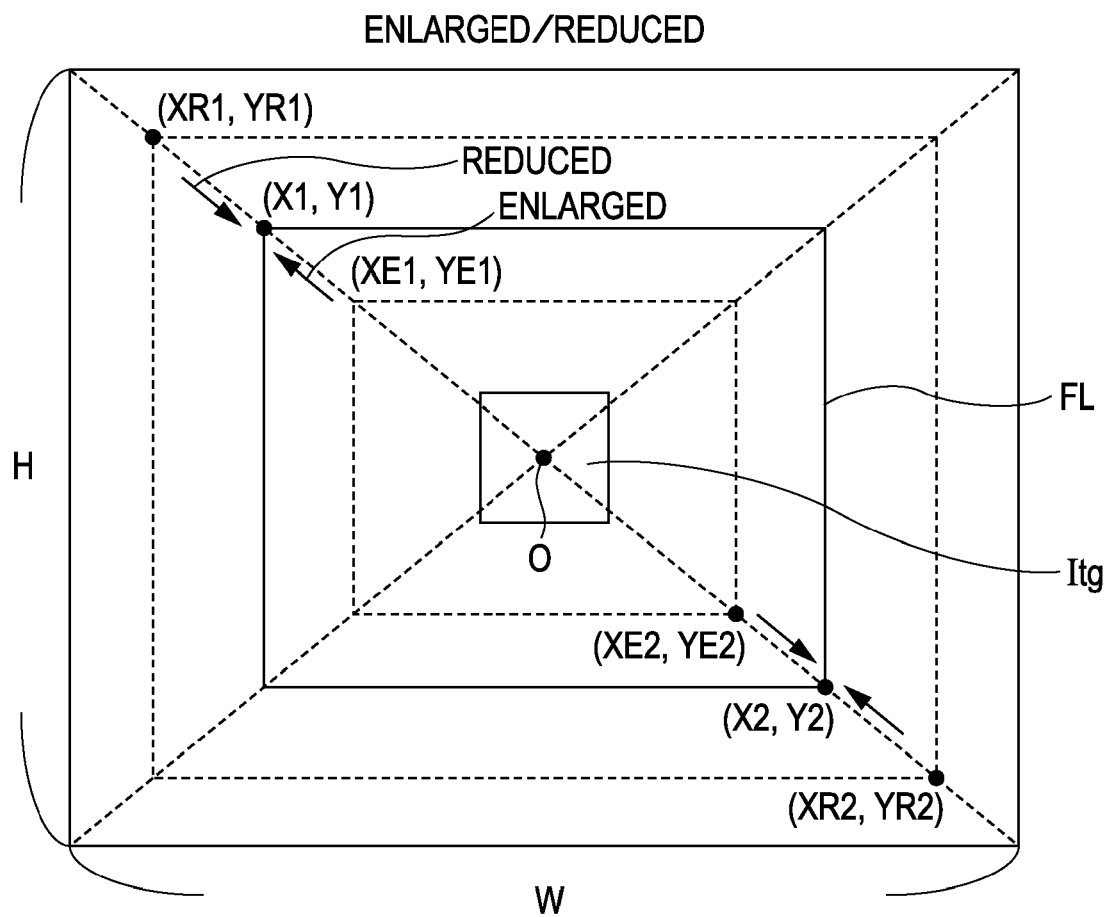
FIG. 17 is a diagram for describing enlargement/reduction mode of GUI with a contents display device according to an embodiment of the present invention.

This entire map information is, for example as shown in FIG. 16 or 17, generated with the position of the target content (origin position O) as the center, thereby having a region with height H and width W. Here, the region made up of the height H and width W is a distance range region between the target content and each of the other contents. The height H and width W of the GUI map information may be changed for each target content, but with this example, the height H and width W are normalized so as to have the same values as the GUI regarding all target contents.

Upon the display region to be displayed as the GUI being set to the region equal to the entire map information, there are too many contents to be displayed, and overlapping of display images increases, and accordingly, the display image itself has to be reduced.

To this end, with the present embodiment, with the display region to be displayed as the GUI, the display images can be displayed with a predetermined size, and also overlapping thereof can be reduced, as a portion of the entire map information. In FIGS. 16 and 17, a rectangular region indicated with the upper left corner position (X1, Y1), and lower right corner position (X2, Y2) is taken as a display region FL.

Subsequently, with the present embodiment, a parallel movement tool is prepared as a tool for allowing the user to view the GUI of the entire map information. Also, with the present embodiment, an enlargement/reduction tool for allowing the user to enlarge or reduce the GUI to be displayed on the display region FL, is prepared.

Parallel Movement Tool

With the present embodiment, the display region FL can be moved in parallel according to the operation instruction of the user within the entire map information region. For example, when receiving an instruction operation for moving the display region FL in the right direction of the horizontal direction in parallel from the user, for example, in FIG. 16, the display region FL is moved in parallel to a rectangular region indicated with a upper left corner position (XS1, YS1) and lower right corner position (XS2, YS2). Also, for example, when receiving an instruction operation for moving the display region FL in the upper direction of the vertical direction in parallel from the user, for example, in FIG. 16, the display region FL is moved in parallel to a rectangular region indicated with a upper left corner position (XU1, YU1) and lower right corner position (XU2, YU2). It goes without saying that the movement direction may be moved in a diagonal direction by combining the vertical and horizontal directions.

Enlargement/Reduction

Also, with the present embodiment, of the entire map information region, the region included in the display region FL is changed, whereby enlargement and reduction which change the distance representing the strength of relationship can be performed. For example, in a case where an enlargement instruction has been performed by the user, in FIG. 17, a rectangular region indicated with an upper-left corner position (XE1, YE1) and a lower-right corner position (XE2, YE2) is enlarged so as to become the display region FL. Also, in a case where a reduction instruction has been performed by the user, in FIG. 17, a rectangular region indicated with an upper-left corner position (XR1, YR1) and a lower-right corner position (XR2, YR2) is reduced so as to become the display region FL.

Note that, enlargement/reduction changes the number of contents included in the display region FL. In particular, in the case of reduction, the region included in the display region FL increases, so the number of contents is also regarded as increasing. However, in order to prevent overlapping of the display images of contents as much as possible, with the present embodiment, when displaying the display region FL as the GUI, the number of display images of contents to be displayed, i.e., the number of contents is arranged so as not to exceed a predetermined number. In the case of incurring overlapping which makes it difficult for the user to identify the content of the display image of a content, overlapping of the display images is suppressed to the minimum by selecting one content based on the selection criteria and so forth.

Figure 18:
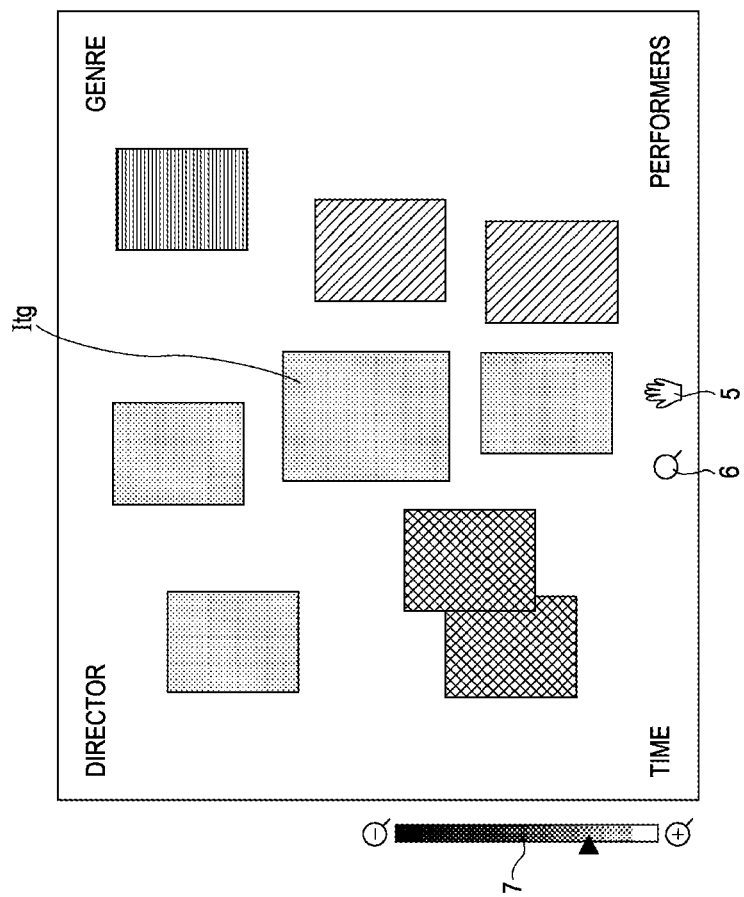
FIG. 18 is a diagram illustrating a display example of GUI with a contents display device according to an embodiment of the present invention.

Instruction Operating Tool such as Enlargement/Reduction and Parallel Movement and so Forth A part of operating tools for the above-mentioned parallel movement and enlargement/reduction is, with the present embodiment, included in the GUI. FIG. 18 is a diagram illustrating an example of the GUI including the operating tools. Instruction operations for parallel movement and enlargement/reduction in the GUI are executed by employing operating tools included in the GUI in FIG. 18, four-direction keys and determining key and so forth provided on a key operating unit included in the client device 2 itself.

As shown in FIG. 18, the operating tools provided in the GUI are tool buttons made up of a button icon, and with this example, are made up of a parallel movement button 5, and a zoom button 6 meaning enlargement/reduction. Also, with this example, with the GUI, a zoom display portion 7 for displaying a zoom level (zoom magnifying power) is also provided.

Operations and mode switching employing the tool buttons 5 and 6, and the four-direction keys and determining key and so forth provided in the key operating unit included in the client device 2 itself are shown in the table in FIG. 19. As can be understood from the table in FIG. 19, in a normal mode, the operations of the up-and-down key and right-and-left key of the key operating unit included in the client device 2 itself become operations for changing a content to be selected from the contents displayed on the GUI. The selected content is informed to the user by the focus frame of a cursor which moves according to the operations of the up-and-down key or right-and-left key moving to the position of the selected content.

In the normal mode, upon the determining key of the operating unit of the client device 2 being operated, the GUI proceeds to a content detailed display mode for displaying the details of the content selected at that time as described later.

Figure 20:
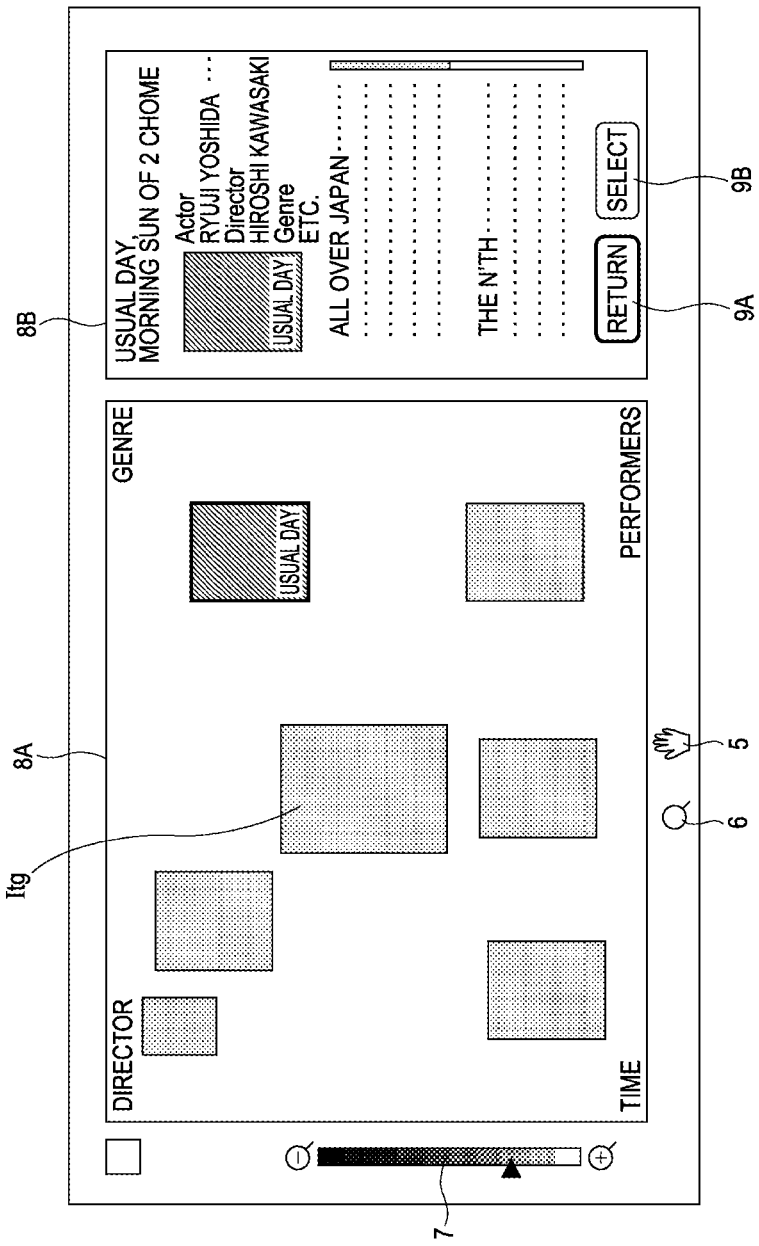
FIG. 20 is a diagram illustrating a display example of GUI with a contents display device according to an embodiment of the present invention.

FIG. 20 illustrates an example of the display screen in the content detailed display mode. As shown in FIG. 20, in the content detailed display mode, the detailed information of the content being selected is displayed on a region 8B on the right side of a region 8A of the GUI screen. With this example, as shown in FIG. 20, a return button 9A and select button 9B are displayed on the region 8B of content detailed information as icon buttons. In the content detailed display mode, upon the user operating the up-and-down key, the content detailed information can be scrolled in the vertical direction.

Subsequently, in the content detailed display mode, upon the select button 9B being selected, and determining key being operated, a message screen is displayed which inquires of the user whether to change the target content to the content being selected, or whether to proceed to the playing mode of the relevant content.

Though not shown in the drawing, a play button and change button are displayed on this message screen, and upon the user selecting the play button, the content being selected proceeds to the play mode. Also, upon the user selecting the change button, processing for changing the target content to the content being selected is performed.

In the content detailed display mode, upon the return button being selected, and the determining key being operated, the GUI returns to the screen in the normal mode from the screen in the content detailed display mode. Note that, with the present embodiment, in the normal mode, upon the four-direction key being operated, the GUI automatically goes to a state in a focus movement mode wherein the focus frame of the cursor is moved to the content closed to the direction instructed by the relevant direction key.

The focus movement mode is a mode wherein the content being selected is moved to a content positioned closest to the direction instructed by the user from the content being currently selected sequentially. That is to say, as shown in FIG. 21, the focus frame (selected content) of the cursor is automatically moved to another content from the content being currently selected in accordance with the direction instructed by the user.

Figure 21:
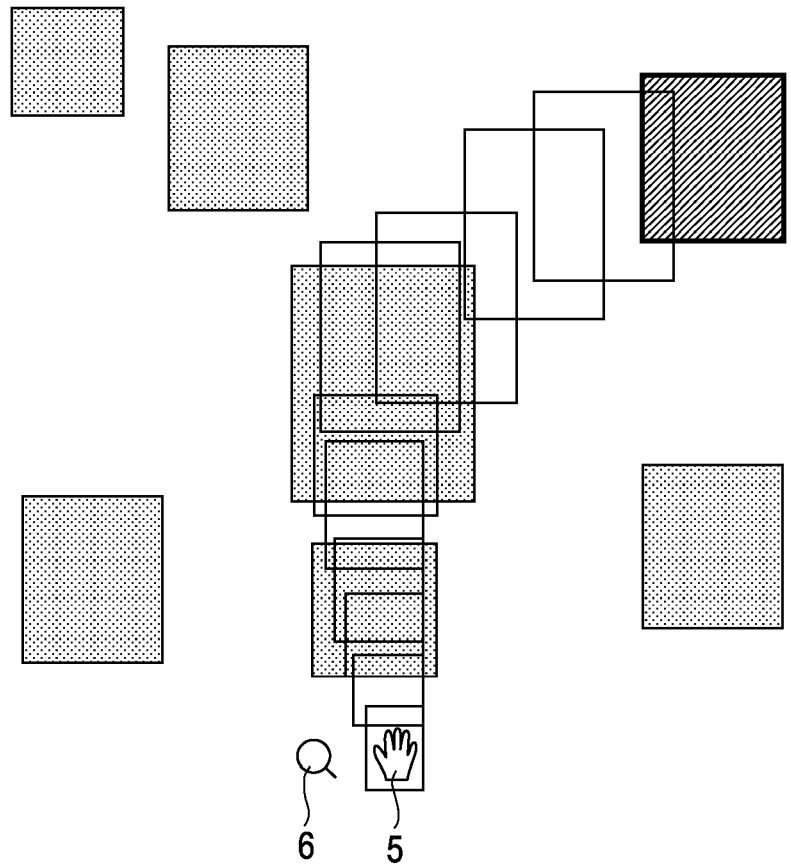
FIG. 21 is a diagram for describing focus movement mode of GUI with a contents display device according to an embodiment of the present invention.

The example in FIG. 21 is a case where the four-direction keys are pressed from left, down, and down sequentially. With the example in FIG. 21, there are contents not displayed on the region 8A of the GUI screen further downward (direction far away from the target content), so in order to prompt the user to press the parallel movement button 5, the parallel movement button 5 is in a focused state.

Also, in the normal mode, upon the zoom button 6 being selected, and the determining key being pressed, the GUI is switched to an enlargement/reduction mode. In the enlargement/reduction mode, the up key operation becomes an enlargement instruction, down key operation becomes a reduction instruction, and right-and-left key operation becomes invalid. Subsequently, in the enlargement/reduction mode, upon the determining key being pressed again, the GUI returns to the normal mode from the enlargement/reduction mode.

Also, in the normal mode, upon the parallel movement button 5 being selected, and the determining key being pressed, the GUI is switched to the parallel movement mode. In the parallel movement mode, as described above, the display region FL is moved in parallel in the direction instructed by the four-direction key on the entire map region. Subsequently, in the parallel movement mode, upon the determining key being pressed again, the GUI returns to the normal mode from the enlargement/reduction mode.

Figure 22:
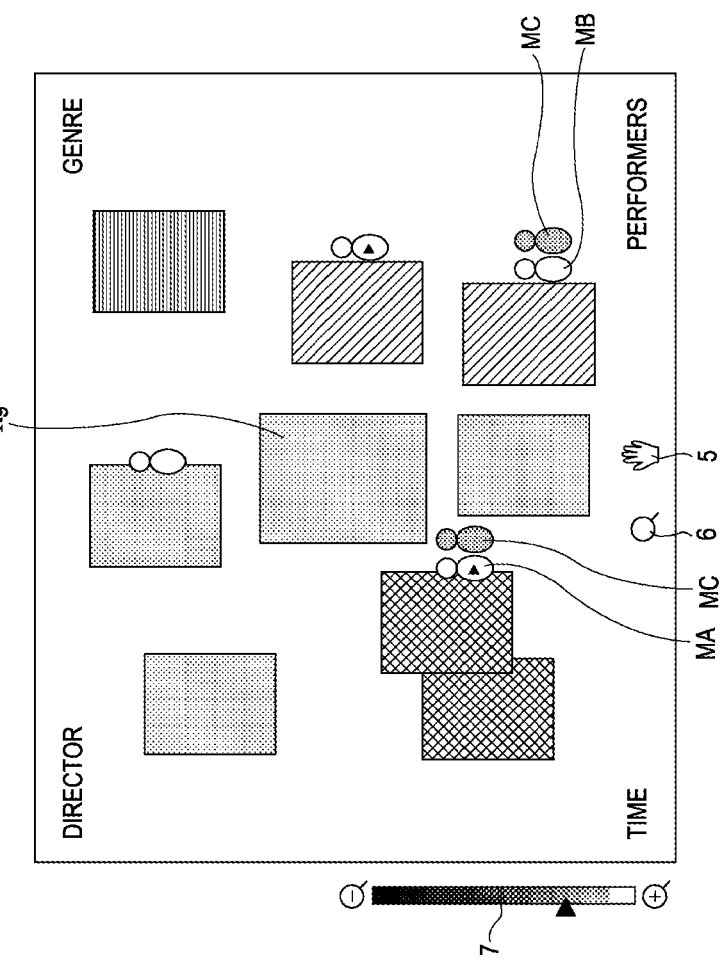
FIG. 22 is a diagram illustrating a display example of GUI with a contents display device according to an embodiment of the present invention.

With the GUI display example in FIG. 18, of the metadata, the user's access history is not reflected in the display of contents. FIG. 22 illustrates a GUI example on which the user's access history has been reflected. In FIG. 22, marks MA, MB, and MC are marks representing that the user has accessed a content. These marks MA, MB, and MC are displayed in the vicinity of the display image of an accessed content or partially in an overlapped manner.

The marks MA and MB are expressly displayed as opaque marks, and indicate that another user is currently accessing this content. Also, the mark MC is indicated as a translucent mark, and this indicates that another user accessed the corresponding content in the past.

Subsequently, the mark MA indicates that the relevant content is currently being played by another user by superimposing a triangle mark on a figure indicating a user. Also, the mark MB is made up of only a figure indicating a user, and this indicates that another user currently displays the relevant content as the target content or another content adjacent to the target content (content having strong relationship) in the GUI.

The server device 1 generates the marks MA, MB and MC from the metadata of access history to reflect on each GUI.

Hardware Configuration Example of Server Device 1

Figure 23:
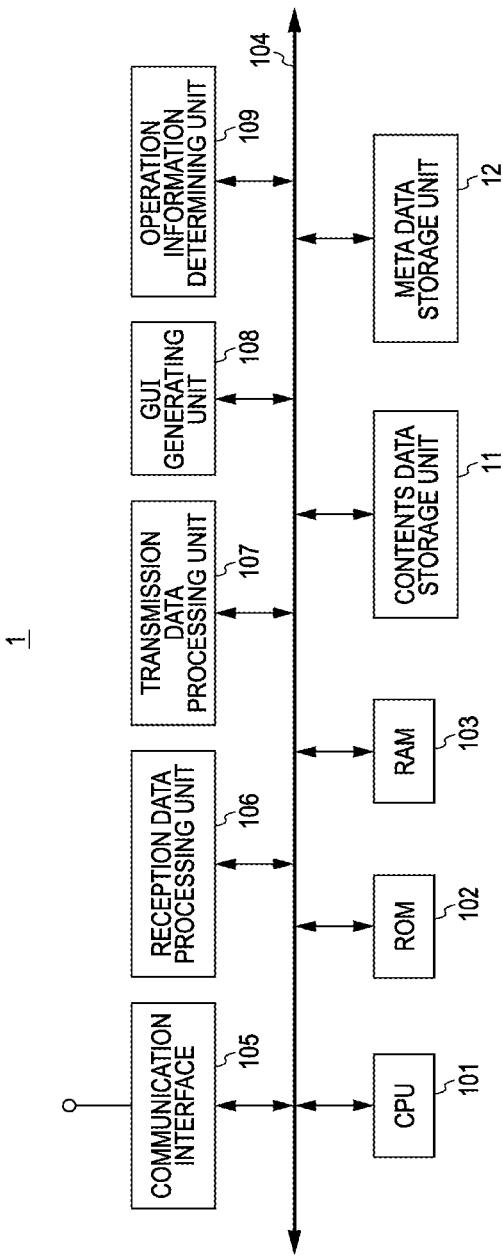
FIG. 23 is a diagram illustrating a hardware configuration example of a server device making up a portion of the contents display device according to the first embodiment of the present invention.

FIG. 23 illustrates a hardware configuration example of the server device 1 according to the present embodiment for realizing the above-mentioned GUI. The server device 1 of this example is configured employing a computer. Specifically, as shown in FIG. 23, a CPU (Central Processing Unit) 101, ROM (Read Only Memory) 102, and RAM (Random Access Memory) 103 are connected to a system bus 104. The ROM 102 stores programs for processing, such as a program for generating a GUI, a program for communicating with the client device 2, and so forth. The RAM 103 is memory employed for a work area.

The above-mentioned contents data storage unit 11 and metadata storage unit 12 are also connected to the system bus 104. Further, a communication interface 105, reception data processing unit 106, transmission data processing unit 107, GUI generating unit 108, and operation information determining unit 109 are connected to the system bus 104.

The reception data processing unit 106 receives, under the control of the CPU 101, data transmitted from the client device 2 through the communication interface 105, converts this into a data form which can be processed within the server device 1, and transmits this to the system bus 104.

The transmission data processing unit 107 generates, under the control of the CPU 101, data to be transmitted to the client device 2 from the server device 1, and transfers this to the communication interface 105.

The GUI generating unit 108 generates, under the control of the CPU 101, the above-mentioned GUI information, and transfers this to the transmission data processing unit 107.

Of the information received from the client device 2 at the reception data processing unit 106, with regard to the operation information, the operation information determining unit 109 determines whether the operation information is what kind of operation information, and informs the CPU 101 of the determination result through the system bus 104.

When the determination result from the operation information is a GUI display request, the CPU 101 causes the GUI generating unit 108 to start generation of a GUI. The GUI generating unit 108 obtains the metadata stored in the metadata storage unit 12 to generate a GUI.

When the determination result from the operation information is a content playing request, the CPU 101 reads out the body data of the requested content, and downloads this to the requesting client device 2. The client device 2 subjects this content to streaming playing.

Note that the reception data processing unit 106, transmission data processing unit 107, GUI generating unit 108, and operation information determining unit 109 may also be configured as a software function unit wherein the CPU 101 performs processing in accordance with the program stored in the ROM 102.

Hardware Configuration Example of Client Device 2

Figure 24:
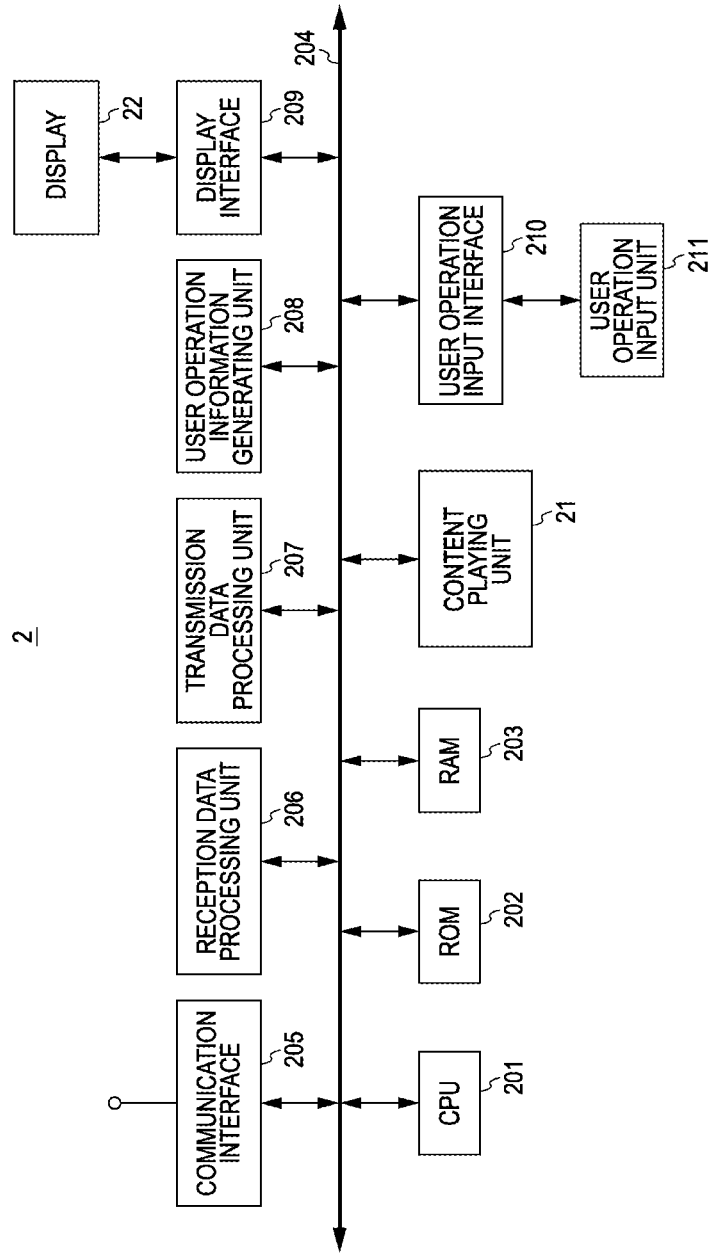
FIG. 24 is a diagram illustrating a hardware configuration example of a client device making up a portion of the contents display device according to the first embodiment of the present invention.

FIG. 24 illustrates a hardware configuration example of the client device 2 according to the present embodiment. The client device 2 of this example is configured by employing a personal computer for example. Specifically, as shown in FIG. 24, a CPU 201, ROM 202, and RAM 203 are connected to a system bus 204. The ROM 202 stores programs for processing, such as a program for communicating with the server device 1, a program for receiving GUI information from the server device 1 to display this on the display, a program for transmitting user operation information to the server device 1, and so forth. The RAM 203 is memory employed for a work area.

The above-mentioned content playing unit 21 and display 22 are also connected to the system bus 204. Further, a communication interface 205, reception data processing unit 206, transmission data processing unit 207, user operation information generating unit 208, display interface 209, and user operation input interface 210 are connected to the system bus 204.

The display 22 is connected to the display interface 209, and a user operation input unit 211 is connected to the user operation input interface 210. With this example, the user operation input unit 211 includes at least the above-mentioned four-direction keys and determining key. The user operation input unit 211 may be configured of a transmission unit and reception unit for a remote control signal.

The reception data processing unit 206 receives, under the control of the CPU 201, data transmitted from the server device 1 through the communication interface 205, converts this into a data form which can be processed within the client device 2, and transmits this to the system bus 204.

The transmission data processing unit 207 generates, under the control of the CPU 201, data to be transmitted to the server device 1 from the client device 2, and transfers this to the communication interface 205.

The user operation input information through the user operation input unit 211 is transmitted to the system bus 204 through the user operation input interface 210. The CPU 201 analyzes and distinguishes the user operation input information to perform processing according to the operation input information thereof. With this example, when the user operation input information is operation input instruction information as to the GUI, the CPU 201 transmits the operation input instruction information to the user operation information generating unit 208.

The user operation information generating unit 208 generates, under the control of the CPU 201, user operation information to be transmitted to the server device 1 from the above-mentioned operation input instruction information, and transfers the generated user operation information to the transmission data processing unit 207.

The display interface 209 transmits, under the control of the CPU 201, the GUI display information received from the server device 1 to the display 22 to display the GUI on the display screen thereof.

When transmitting a content playing request to the server device 1, the CPU 201 transmits the body data of a content transmitted from the server device 1 to the content playing unit 21, and with the present embodiment, the content thereof is subjected to streaming playing.

Note that the reception data processing unit 206, transmission data processing unit 207, user operation information generating unit 208, and content playing unit 21 may also be configured as a software function unit wherein the CPU 201 performs processing in accordance with the program stored in the ROM 202. GUI generating processing flow with the server device 1 and client device 2

Figure 25:
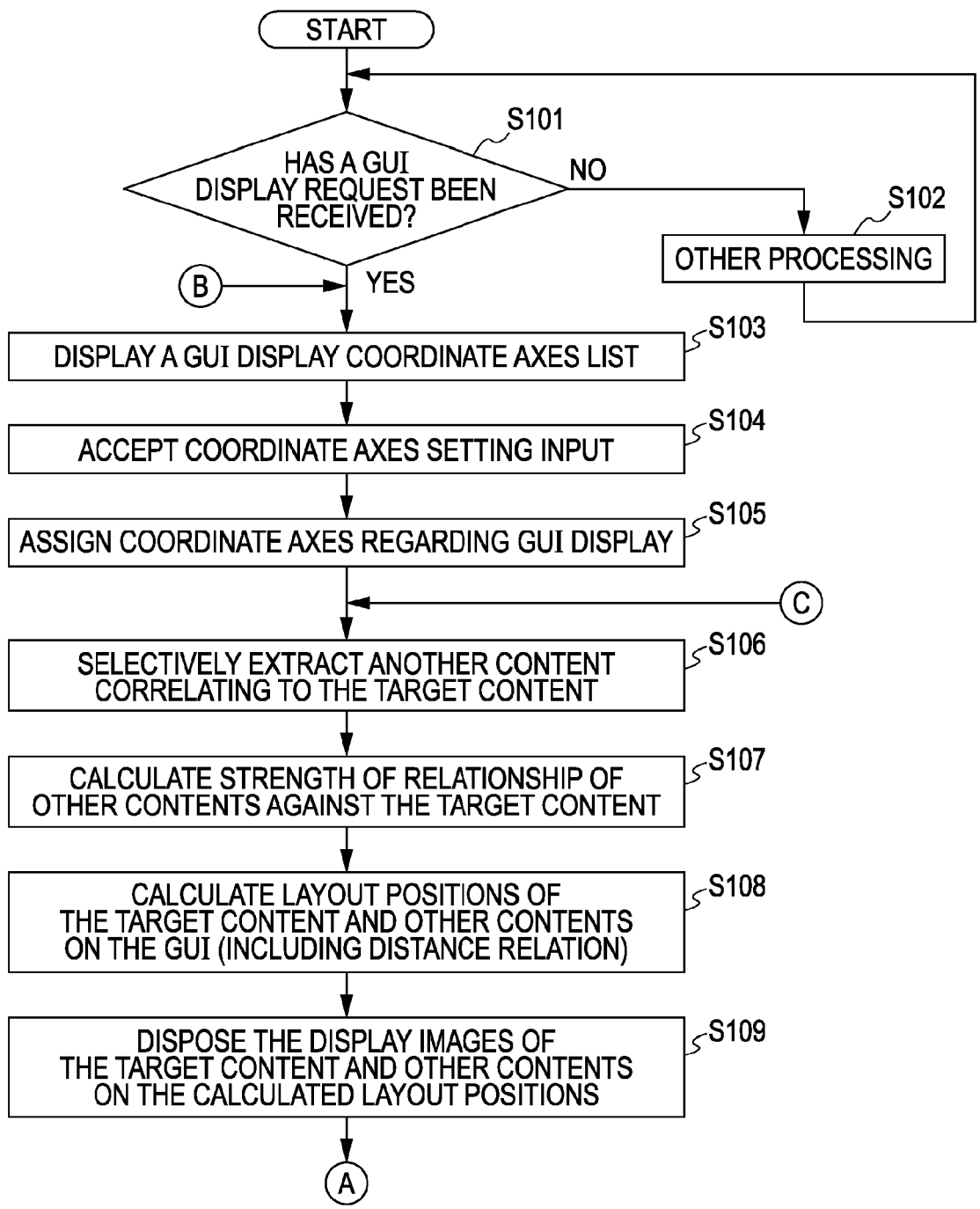
FIG. 25 is a diagram illustrating a portion of a flowchart for describing GUI generation and display processing with a content display device according to an embodiment of the present invention.
Figure 26:
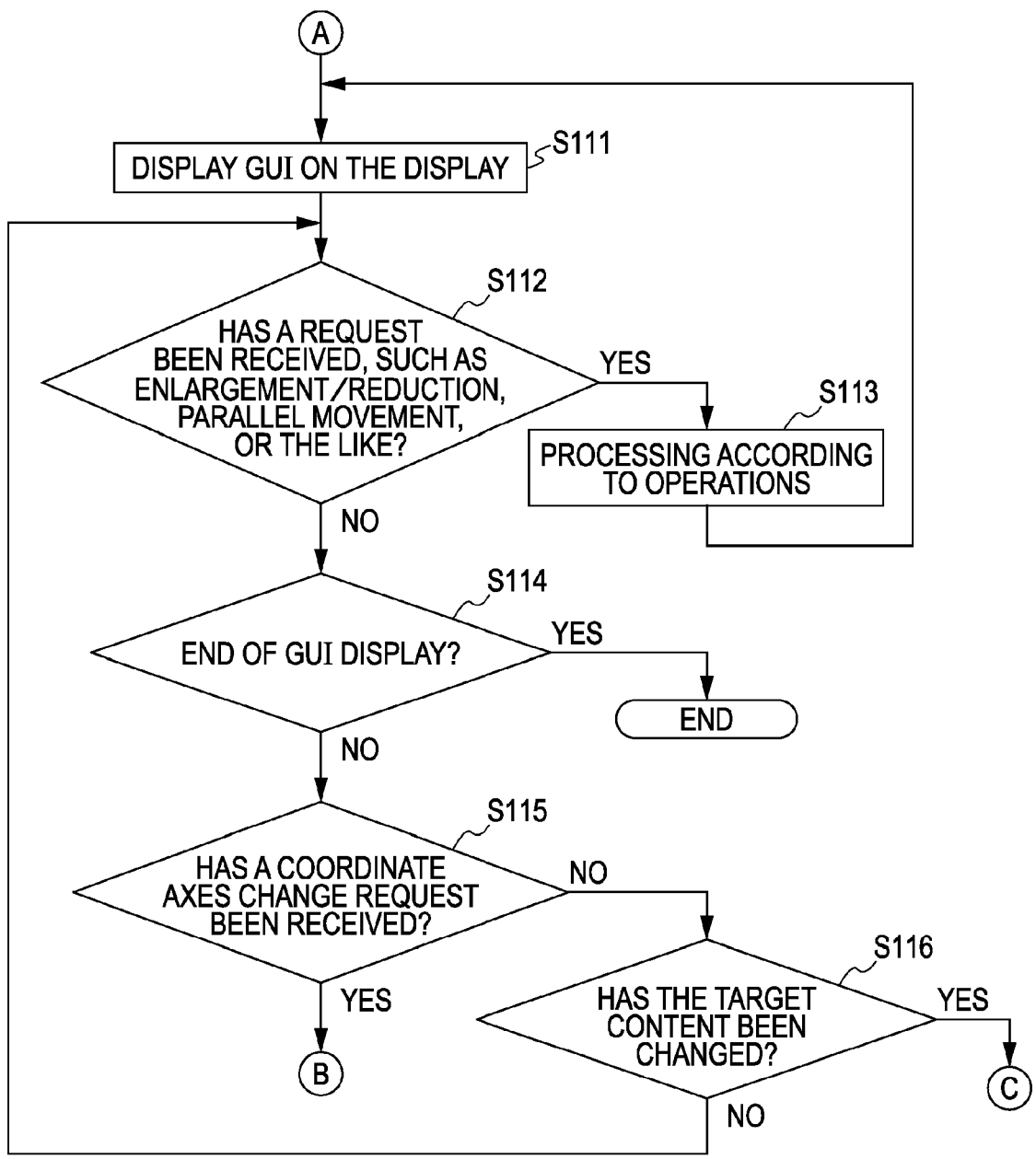
FIG. 26 is a diagram illustrating a portion of the flowchart for describing the GUI generation and display processing with a content display device according to an embodiment of the present invention.

FIGS. 25 and 26 are a flowchart for describing the flow of processing operation for generating a GUI by the client device 2 and the GUI generating unit 108 of the server device 1 collaborating.

First, the server device 1 monitors whether to have received a GUI display request from the client device 2 (step S101), and when determining that a GUI display request has not been received, executes other processing (step S102), and subsequently, returns to step S101.

When determining that a GUI display request has been received in step S101, the server device 1 transmits a list of content features (see FIG. 10) serving as coordinate axes of GUI display to the client device 2 which has transmitted a GUI display request (step S103).

At this time, the server device 1 attempts to recognize the user identifier of the user of the client device 2 which has transmitted a GUI display request. The server device 1 includes a management memory unit (not shown) regarding the client devices, and the identifier of each of the client devices, and the correspondence as to the user identifier of the user thereof are registered beforehand in the management memory unit. The server device 1 employs the identifier of the client device 2 included in the information at the time of access to read out and recognize the user identifier stored in this management memory unit.

The client device 2 displays a list of content features serving as the coordinates of GUI display transmitted from the server device 1 on the display screen of the display 22, and accepts the setting input of the coordinate axis. Subsequently, the client device 2 transmits the setting information of the accepted coordinate axis to the server device 1.

The GUI generating unit 108 of the server device 1 accepts the setting information of the coordinate axis to recognize the number of content features serving as the coordinate axes, and what each of the content features is (step S104).

Subsequently, the GUI generating unit 108 of the server device 1 performs assignment of the coordinate axes of GUI display according to the number of content features serving as the coordinate axes, as described with reference to FIGS. 12 through 14 (step S105).

Next, the GUI generating unit 108 of the server device 1 determines the target content. As described above, the target content is selected by the user of the client device at the portal page when the client device 2 accessed the server device 1. When a predetermined content is being played while the client device 2 accessing the server device 1, the content being played is taken as the target content. The GUI generating unit 108 of the server device 1 recognizes such a target content.

Subsequently, the GUI generating unit 108 of the server device 1 searches the metadata of the metadata storage unit 12 based on the content features serving as coordinate axes recognized in step S104. Subsequently, the GUI generating unit 108 of the server device 1 selectively extracts other contents relating to the target content according to the search thereof (step S106).

Subsequently, the GUI generating unit 108 of the server device 1 calculates the strength of relationship as to the target content of the selectively extracted other contents based on the metadata of the metadata storage unit 12, as described above (step S107).

Next, the GUI generating unit 108 of the server device 1 calculates the layout of the display images of the contents on the GUI display while considering the strength of relationship between the target content and each of the other contents calculated in step S107, and the relation with the coordinate axes (step S108). The calculation method of this layout is as described above. Thus, the entire map information regarding the target content has been generated.

Next, the GUI generating unit 108 of the server device 1 determines the display region FL, obtains the display images of the target content and the other contents from the metadata storage unit 12, and disposes these on the layout positions calculated in step S108 (step S109).

Subsequently, the server device 1 transmits the GUI display information of the display region FL generated in step S109 to the client device 2. The client device 2 displays, based on the received GUI display information, the GUI on the display screen of the display 22 (step S111 in FIG. 26).

Next, the client device 2 determines whether or not an enlargement/reduction operation or parallel movement operation or the like has been performed (step S112). When determining that an enlargement/reduction operation or parallel movement operation or the like has been performed, the client device 2 transmits the user operation information such as the enlargement/reduction operation or parallel movement operation or the like to the server device 1. The server device 1 generates the display information subjected to enlargement/reduction or parallel movement regarding the GUI, and the display information of the other modified GUI according to the received user operation information, and transmits this to the client device 2 (step S113). Subsequently, the processing returns to step S111, where the client device 2 displays the GUI on the display screen of the display 22 based on the received GUI display information.

Also, when determination is made in step S112 that an enlargement/reduction operation or parallel movement operation or the like has not been performed, the client device 2 or server device 1 determines whether to end the GUI display (step S114). In step S114, for example, determination is made whether to have received a playing instruction regarding the content selected from the GUI display, or whether to have received an end instruction of the GUI display from the user.

When determination is made in step S114 that the GUI display is not ended, the client device 2 determines whether to have received a modification instruction of the coordinate axes from the user. When determining that a modification instruction of the coordinate axes has been received, the client device 2 transmits the determination result thereof to the server device 1. The server device 1 determines whether to have received a modification instruction of the coordinate axes from the client device 2, thereby determining whether to have received a modification instruction of the coordinate axes (step S115).

Subsequently, the processing returns to step S103 in FIG. 25, where the server device 1 transmits the information of the coordinate axis list to the client device 2. The client device 2 performs the setting input of a new coordinate axis from the coordinate axis list. Subsequently, the above-mentioned processing in step S104 and thereafter is repeated.

Also, when determination is made in step S115 that a modification instruction of the coordinate axes has not been received, the server device 1 determines based on the user operation information from the client device 2 whether or not the target content has been changed (step S116). When determination is made in step S116 that the target content has been changed, the server device 1 returns to step S106 in FIG. 25 to start processing for generating the GUI regarding the new target content. Subsequently, the server device 1 repeats the processing in step S106 and thereafter.

Also, when determination is made in step S116 that the target content has not been changed, the processing returns to step S112, where the client device 2 and server device 1 repeat the processing in step S112 and thereafter.

Subsequently, when determination is made in step S114 that the GUI display is ended, the client device 2 and server device 1 end the above-mentioned processing regarding the GUI.

Figure 27:
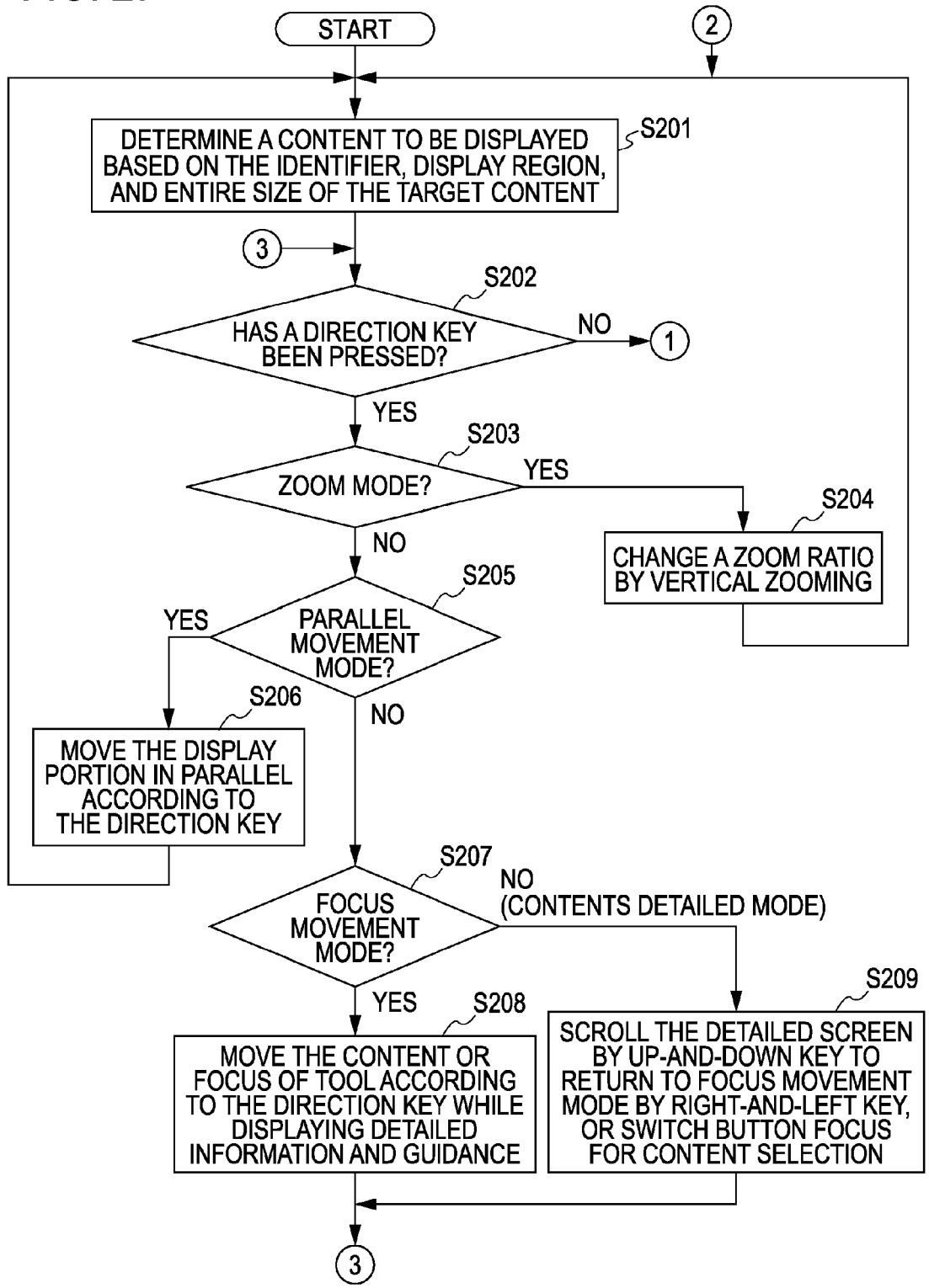
FIG. 27 is a diagram illustrating a portion of a flowchart for describing GUI generation and display processing with a content display device according to an embodiment of the present invention.
Figure 28:
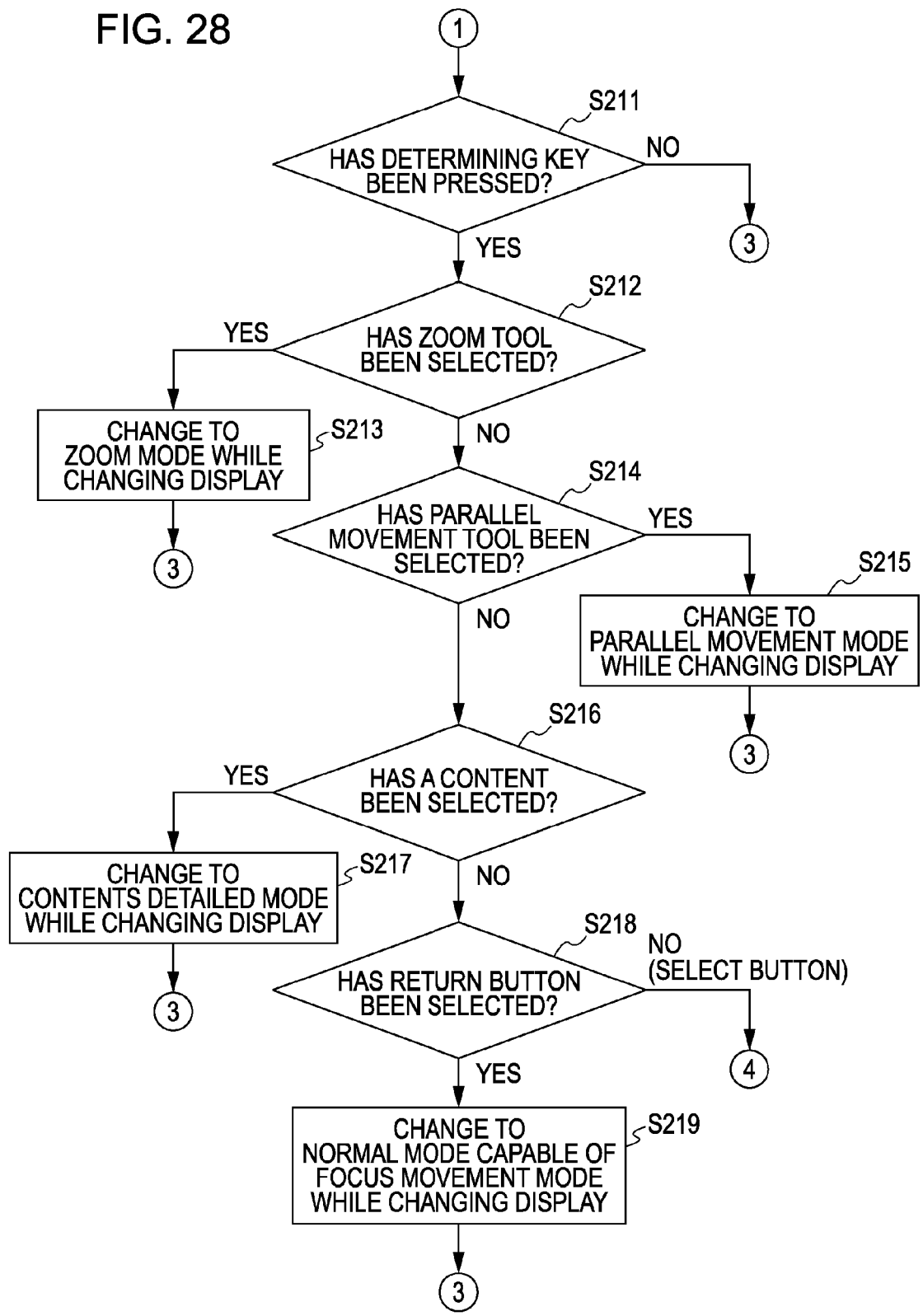
FIG. 28 is a diagram illustrating a portion of a flowchart for describing the GUI generation and display processing with the content display device according to an embodiment of the present invention.
Figure 29:
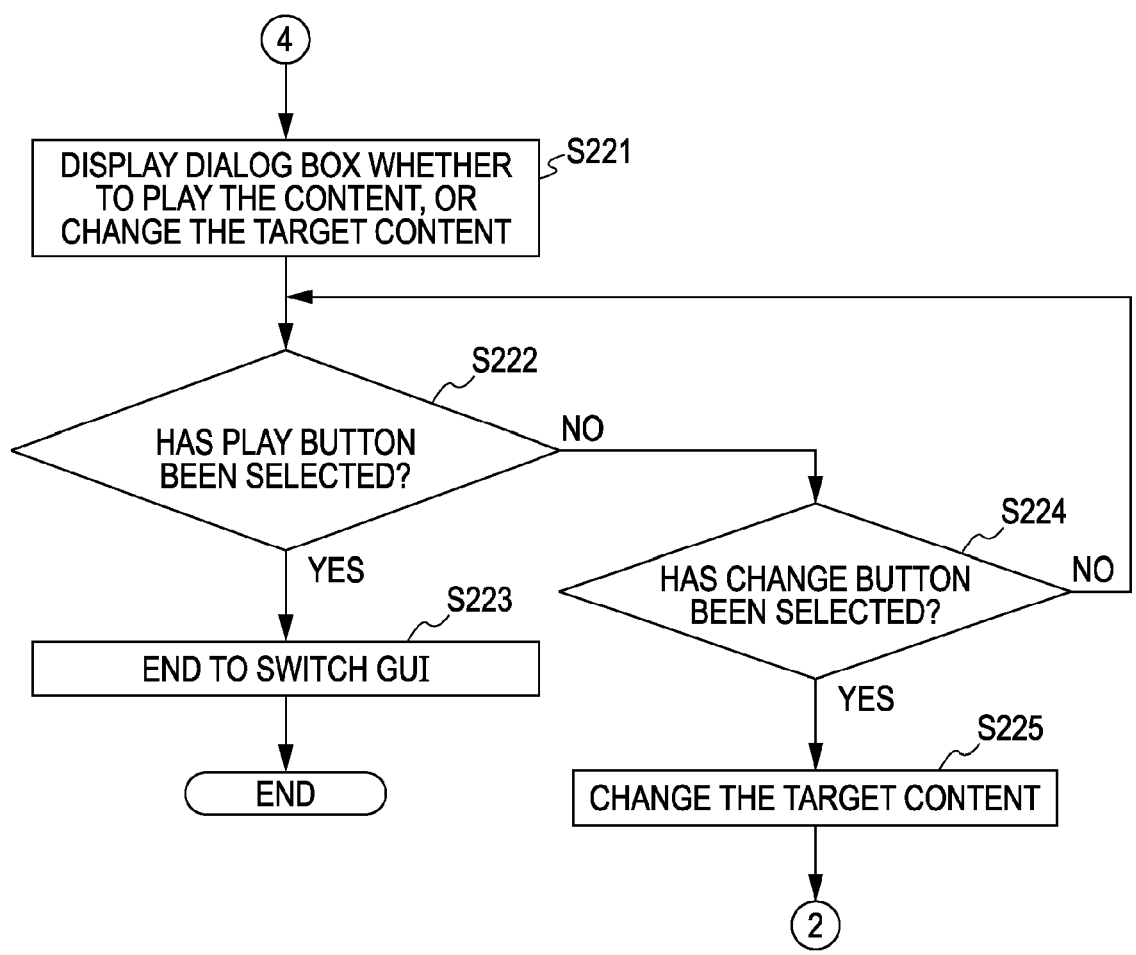
FIG. 29 is a diagram illustrating a portion of a flowchart for describing the GUI generation and display processing with the content display device according to an embodiment of the present invention.

Processing Operation Regarding Each Type of Mode Such as Enlargement/Reduction, Parallel Movement, Content Detailed Display or the Like Next, description will be made further regarding the details of the processing operation relating to various modes such as enlargement/reduction, parallel movement, or the like shown in as steps S111 through S116 in the above-mentioned flowchart in FIG. 26 with reference to the flowchart in FIGS. 27 through 29.

First, the GUI generating unit 108 of the server device 1 determines the contents to be displayed based on the identifier of the target content, display region FL, and the entire size of the entire map information to generate a GUI (step S201). The display information of the generated GUI is transmitted to the client device 2, and displayed on the display 22. This step S201 is equivalent to the above-mentioned processing in steps S106 through S109.

Next, the CPU 101 of the server device 1 monitors the user operation information from the client device 2, and determines whether or not one of the four-direction keys has been pressed (step S202). When determination is made in step S202 that one of the four-direction keys has been pressed, the CPU 101 determines whether or not the current mode is the enlargement/reduction mode (zoom mode) (step S203).

When determination is made in step S203 that the current mode is the zoom mode, the CPU 101 of the server device 1 accepts the operation of the four-direction keys, and according to the operation of the accepted four-direction key thereof, the zoom ratio (enlargement ratio or reduction ratio) of the GUI display information is changed (step S204). Following this step S204, the processing returns to step S201.

At this time, of the region of the GUI entire map information, the size of the region included in the display region FL is changed according to the change in the zoom ratio, the GUI generating unit 108 of the server device 1 updates the contents to be displayed successively to generate the display information of a new GUI. The generated GUI display information is transmitted to the client device 2, and displayed on the display 22 thereof.

When determination is made in step S203 that the current mode is not the zoom mode, the CPU 101 determines whether or not the current mode is the parallel movement mode (step S205). When determination is made in step S205 that the current mode is the parallel movement mode, the CPU 101 accepts the operation of the four-direction keys, and according to the operation of the accepted four-direction key thereof, the display region FL of the GUI is moved in parallel in the region of the entire map information (step S206). Following this step S206, the processing returns to step S201.

At this time, in step S201, with the GUI generating unit 108, according to the change in the display region FL of the region of the GUI entire map information, the contents to be displayed are updated, and the display information of a new GUI is generated. Subsequently, the generating GUI display information is transmitted to the client device 2, and displayed on the display 22 thereof.

Also, when determination is made in step S205 that the current mode is not the parallel movement mode, the CPU 101 of the sever device 1 determines whether or not the current mode is the focus movement mode (step S207). When determination is made in step S207 that the current mode is the focus movement mode, the CPU 101 controls the GUI generating unit 108 to perform the focus movement mode, as described with reference to FIG. 21. Specifically, the display image of a content or the focus of a tool icon are moved according to the direction instructed by a direction key, and also content detailed information or guide is displayed (step S208). Following this step S208, the processing returns to step S202, and the processing in step S202 and thereafter is repeated.

Also, when determination is made in step S207 that the current mode is not the focus movement mode, the CPU 101 determines that the current mode is the content detailed mode. Subsequently, the CPU 101 controls the GUI generating unit 108 to perform the GUI display according to the direction key operation with the GUI display at the time of the content detailed mode described with reference to FIG. 20 (step S209). Following this step S209, the processing returns to step S202, and the processing in step S202 and thereafter is repeated.

Next, when determination is made in step S202 that none of the direction keys has been pressed, the CPU 101 determines whether or not the determining key has been pressed at the client device 2 (step S211). When determination is made in step S211 that the determining key has not been pressed, the CPU 101 returns step S202, and repeats the processing in step S202 and thereafter.

When determination is made in step S211 that the determining key has been pressed, the CPU 101 determines whether or not the focus position of the cursor is in the zoom button 6, i.e., whether or not the zoom button 6 has been selected (step S212). Subsequently, when determination is made that the zoom button 6 has been selected, the CPU 101 switches the GUI mode to the zoom mode, and controls the GUI generating unit 108 so as to subject the GUI to the enlargement processing or reduction processing according to the up-and-down key operation by the user (step S213). Subsequently, the CPU 101 returns step S202, and repeats the processing in step S202 and thereafter.

When determination is made in step S212 that the zoom button 6 has not been selected, the CPU 101 determines whether or not the parallel movement button 5 has been selected (step S214). When determination is made in step S214 that the parallel movement button 5 has been selected, the CPU 101 switches the GUI mode to the parallel movement mode. Subsequently, the CPU 101 controls the GUI generating unit 108 so as to subject the GUI to the parallel movement processing according to the four-direction key operation by the user (step S215). Subsequently, the CPU 101 returns step S202, and repeats the processing in step S202 and thereafter.

Also, when determination is made in step S214 that the parallel movement button 5 has not been selected, the CPU 101 determines whether the focus position of the cursor is in a predetermined content, i.e., whether or not this content has been selected (step S216). When determination is made in step S216 that this content has been selected, the CPU 101 switches the GUI mode to the content detailed mode to change the display to the screen in the content detailed mode (step S217). Subsequently, the CPU 101 returns step S202, and repeats the processing in step S202 and thereafter.

When determination is made in step S216 that no content has been selected, determination is made whether or not the focus position of the cursor is in the return button 9A, i.e., whether or not the return button 9A has been selected (step S218). When determination is made in step S218 that the return button 9A has been selected, the CPU 101 switches the content detailed mode to the normal mode (including the focus movement mode). Subsequently, the CPU 101 returns step S202, and repeats the processing in step S202 and thereafter.

When determination is made in step S218 that the return button 9A has not been selected, the CPU 101 determines that the focus position of the cursor is in the select button 9B, i.e., determines that the select button 9B has been selected. Subsequently, the CPU 101 displays a dialogue box for inquiring of the user whether to play the content of the display image focused when the select button 9B was pressed, or whether to change the target content to the selected content (step S221 in FIG. 29).

With this dialogue box, as described above, the button icons of a play button and change button, which allow the user to execute a play instruction or change instruction, are also displayed, whereby the user can operate one of the button icons. Subsequently, the client device 2 transmits the user operation information of one the of the button icons by the user to the server device 1.

Subsequently, the CPU 101 of the server device 1 determines whether or not the play button has been selected (step S222), and when determination is made that the play button has been pressed, the CPU 101 ends the processing routine to switch the GUI to a GUI for playing (step S223).

Also, when determination is made in step S222 that the play button has not been pressed, the CPU 101 determines whether or not the change button has been pressed (step S224), and when determination is made that the change button has not been pressed, the CPU 101 returns to step S222. When determination is made that the change button has been pressed, the CPU 101 determines that the target content has been changed, and transmits the identifier of the changed target content to the GUI generating unit 108 to instruct change/generation of GUI (step S225).

Subsequently, the processing returns to step S201, where the GUI generating unit 108 generates a new GUI. Thus, the target content is changed to the content newly selected by the user to generate a new GUI, and this is transmitted to the client device 2 from the server device 1, and displayed on the display 22 screen.

Regarding Advertising

With the above-mentioned description, though no advertising has been added to the display image of a content, advertising information relating to a content is stored in the metadata storage unit 12 as metadata, whereby the advertising relating to the content can also be displayed.

FIRST EXAMPLE

FIG. 30 illustrates an example of metadata relating to advertising. That is to say, with this example, metadata relating to advertising is made up of an advertising identifier cm_id assigned for each advertisement, a storage position address cm_image_url where the display image of the advertisement is stored, and content identifiers content_id_1, content_id_2, and so on of the relevant one or multiple contents.

With the server device 1, regarding whether or not there is an advertisement relating to a content to be displayed on the GUI can be determined by referencing the metadata in FIG. 30 to determine whether or not there is the metadata of an advertisement corresponding to the identifier of the display content thereof.

Subsequently, when determining that there is an advertisement relating to the content to be displayed on the GUI, the server device 1 obtains the display image of the advertisement from the storage position address cm_image_url where the display image of the advertisement thereof is stored, and displays this in a manner correlated with the content thereof.

Figure 31:
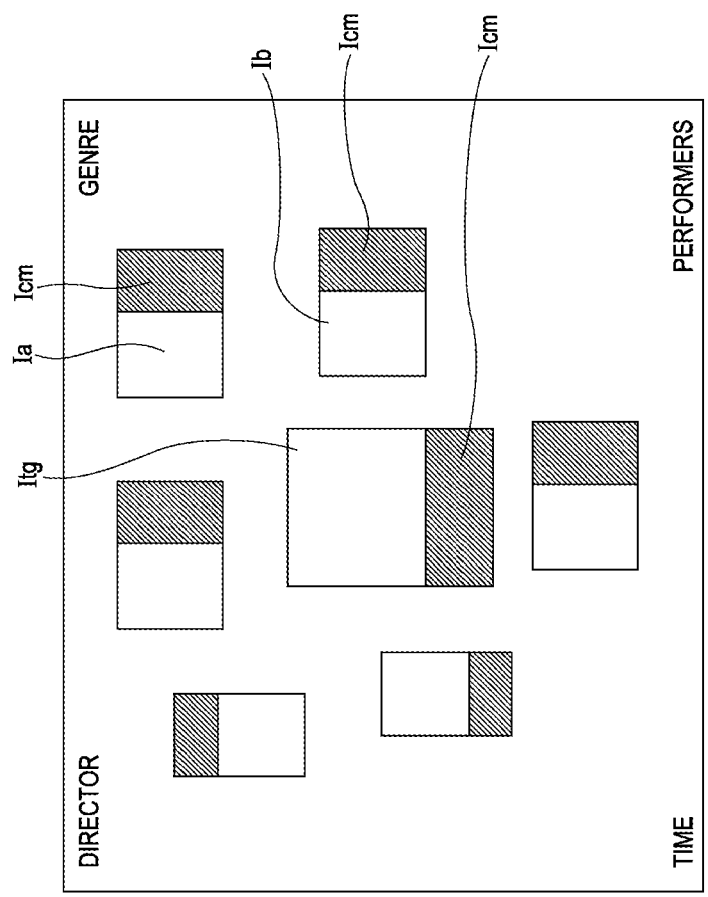
FIG. 31 is a diagram illustrating a display example of GUI with a contents display device according to an embodiment of the present invention.

FIG. 31 illustrates an example of a GUI where an advertisement is displayed in a manner correlated with a content. In FIG. 31, portions to which shade lines are added are advertising display images Icm. Specifically, the example in FIG. 31 illustrates when there are advertisements relating to contents to be displayed on the GUI, wherein content display images Itg, Ib, and Ic are displayed to which the advertising display image Icm is added.

SECOND EXAMPLE

With a second example, advertising is also handled as a content. Accordingly, with regard to advertising as well, metadata similar to the above-mentioned movie content or music content or the like is generated and stored in the metadata storage unit 12.

Thus, when the target content is determined, and the setting input of a content feature serving as a coordinate axis is performed, an advertising content is also selected as other contents. Subsequently, the display image of the advertising content is disposed in the layout position according to the strength of relationship corresponding to the target content.

Second Embodiment

The first embodiment is the configuration of the system wherein the content display device is configured of the server device and client devices. However, it goes without saying that the content display device according to the present invention may be a standalone configuration made up of a content playing device alone. The second embodiment is a case where the content display device according to the present invention is configured of a standalone content playing device.

FIG. 32 is a block diagram illustrating a hardware configuration example of a content playing device according to the second embodiment. The content playing device 200 of this example is configured, for example, by employing a personal computer. Specifically, as shown in FIG. 32, a CPU 221, ROM 222, and RAM 223 are connected to a system bus 220. The ROM 222 stores programs for processing with the content playing device 200, such as a program for generating a GUI to display this on a display 233, and so forth. The RAM 223 is memory employed as a work area.

Also, a contents data storage unit 224 in which the body data of a content is stored, and a metadata storage unit 225 in which the metadata of a content is stored are connected to the system bus 220. The contents data storage unit 224 and metadata storage unit 225 correspond to the contents data storage unit 11 and metadata storage unit 12 of the server device 1 according to the first embodiment, and the storage data is the same as that in the first embodiment.

Also, a user operation input interface 226, and a content playing unit 227 are connected to the system bus 220. The user operation input interface 226 is connected with a user operation input unit 228. The content playing unit 227 and user operation input unit 228 are similar to the content playing unit 21 and user operation input unit 211 of the client device according to the first embodiment.

Further, a contents acquiring unit 229, GUI generating unit 230, user operation determining unit 231, and display interface 232 are connected to the system bus 220. The display interface 232 is connected with the display 233.

The contents acquiring unit 229 is for acquiring the body data of a content to be stored in the content data storage unit 224.

Various types of unit may be employed as the contents acquiring unit 229. For example, a unit may be employed, which has a function for accessing a contents server device of the Internet to acquire the body data and metadata of a content from the contents server device may be employed.

Also, a unit may be employed, which has a function for acquiring a still image content or moving image content shot with a digital camera by the user. In this case, the body data and metadata of a content may be acquired through a USB (Universal Serial Bus) terminal. Also, a unit may be employed, which acquires the body data and metadata of a content from card-type memory in which a photographed still image or moving image content is stored.

Also, an arrangement may be made wherein the contents acquiring unit 229 further includes a disk drive and so forth, whereby the body data and metadata of a content can be acquired from the disk drive.

The body data of a content acquired from the contents acquiring unit 229 is stored in the contents data storage unit 224, and also the metadata thereof is stored in the metadata storage unit 225.

The GUI generating unit 230 corresponds to the GUI generating unit 108 in the server device 1 according to the first embodiment, and accordingly, the same processing operation as described above can be performed under the control of the CPU 221.

The user operation determining unit 231 corresponds to the operation information determining unit 109 in the server device 1 according to the first embodiment, and accordingly, user operations through the user operation input unit 228 can be determined.

The user operation determining unit 231 and GUI generating unit 230 may also be configured as software based on the program stored in the ROM 222 executed by the CPU 221.

With the content playing device thus configured, in the same way as with the first embodiment, a GUI is generated. Subsequently, the zoom mode, parallel movement mode, content detailed mode, focus movement mode, and so forth can be performed in the same way as with the first embodiment.

Subsequently, with the second embodiment, in a case where the content to be processed is a content shot by a digital camera, for example, the setting input may be performed with a cameraman, shot place, shot time, and so forth as coordinate axes. Thus, for example, in a case where a shot place and shot time are taken as coordinate axes, imaged image contents imaged at the same shot place, and contents of which the shot time is closer to the target content can be displayed in a manner collected in the vicinity of the target content.

Note that, with regard to a user access history in the case of the second embodiment, in a case where the user is independent, the access history of the user thereof is excluded form the metadata. Even with a standalone device, in a case where this device is employed by multiple users such as a family or the like, it goes without saying that an arrangement may be made wherein an access history for each user is stored, and this history is employed.

Other Embodiments and Modification

Note that, with the above-mentioned first embodiment, the number of client devices to be connected to the server device may be one. In this case, the preference and access history of another user are not reflected on the UI screen.

Also, with the above-mentioned embodiments, video contents and music contents have been employed as contents, but it goes without saying that the content to be processed is not restricted to this. Also, the above-mentioned metadata is examples, and the metadata is not restricted to the above-mentioned metadata.

The present application contains subject matter related to that disclosed in Japanese Priority Patent Application JP 2008-137396 filed in the Japan Patent Office on May 27, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A contents display device comprising:
a metadata storage unit configured to store metadata for a plurality of contents, the metadata including, for each content of the plurality of contents, at least data for generating a display image of the respective content, attribute data of the respective content, and correlation data indicating at least one correlation between the content and at least one other content of the plurality of contents, each correlation of the at least one correlation identifying a number of times that another content of the at least one other content was selected by one or more users following a selection of the content, wherein the metadata storage unit is configured to store the metadata in a manner correlated with a content identifier of the respective content;
operation input means configured to receive user input to set a content attribute as a coordinate axis;
contents selecting means configured to search the metadata of said metadata storage unit, based on the content attribute and the content identifier of a predetermined content of interest of the plurality of contents, to select two or more other contents of the plurality of contents that relate to said content of interest according to the content attribute;
relation calculating means configured to calculate, for each content of the two or more other contents, a strength of relationship between the content and said content of interest based on at least the content attribute and on correlation data indicating the number of times that the content was selected by the one or more users following selection of the content of interest;
layout relation calculating means configured to calculate, based on said content attribute and said calculated strength of relationship, a position at which to display each of said two or more other contents in relation to said content of interest positioned at an origin, wherein the layout relation calculating means is configured to calculate a position closer to the origin for an other content having a strong relationship with the content of interest than for an other content having a weak relationship with the content of interest; and
display control means configured to display on a display screen the display images of said two or more other contents concurrently, in accordance with said calculated position for each of the two or more other contents, while the display image of said content of interest is concurrently displayed on said origin.

2. The contents display device according to claim 1, wherein said operation input means is configured to receive user input to set two content attributes as adjacent coordinate axes;
and wherein said layout relation calculating means is configured to calculate a first position at which to display the display images of a first other content of the two or more other contents that relates to said content of interest according to the two content attributes, wherein the first position is within a region between said adjacent coordinate axes, and wherein a distance of the first position from the origin is based on the strength of relationship between the first other content and said content of interest.

3. The contents display device according to claim 1 or claim 2, wherein said metadata storage unit is configured to store information indicating selection criteria of said contents as said metadata;
and wherein said contents selecting means is configured to restrict a number of said two or more other contents to be selected based on said selection criteria.

4. The contents display device according to claim 1, wherein said metadata storage unit is configured to store predetermined user preference information as said metadata;
and wherein said relation calculating means is configured to obtain the strength of relationship between said content of interest and each of said two or more other contents based at least in part on said user preference information;
and wherein said layout relation calculating means is configured to determine a distance between the origin and the calculated position for each of said two or more other contents based on said strength of relationship.

5. The contents display device according to claim 4, wherein said user preference information is preference information of a user observing said display screen.

6. The contents display device according to claim 4, wherein said user preference information is preference information of a user other than a user observing said display screen.

7. The contents display device according to claim 1, wherein said metadata storage unit is configured to store access histories of a plurality of users as metadata for each of the plurality of contents;
and wherein said display control means is configured to reflect the access histories of said plurality of users on the display images of said two or more other contents displayed on said display screen.

8. The contents display device according to claim 1, further comprising:
instruction input means configured to receive instruction input to reduce a display distance between contents displayed on the display screen;
wherein said display control means is configured to display the display images of said content of interest and said two or more other contents in accordance with said reduced display distance, and to remove from the display screen, in response to the instruction input to reduce the display distance, one or more contents previously displayed on the display screen.

9. The contents display device according to claim 1, further comprising:
instruction input means configured to receive instruction input indicating a direction for moving a display image of said display screen in parallel;
wherein said display control means is configured to move the display images of the content of interest and the two or more other contents in parallel in the direction instructed.

10. The contents display device according to claim 1, wherein said two or more other contents include an advertising content.

11. The contents display device according to claim 1, wherein said metadata includes data regarding advertising information relevant to the content of interest;

and wherein the display control means is configured to display said advertising information in association with the display images of the content of interest and the two or more other contents on said display screen.

12. The contents display device according to claim 1, further comprising:

accepting means configured to accept an instruction to change from said content of interest to a new content of interest;

wherein said contents selecting means is configured to obtain one or more new other contents relevant to the new content of interest;

and wherein said relation calculating means is configured to calculate a new strength of relationship between each of the one or more new other contents and the new content of interest, and wherein said layout relation calculating means is configured to calculate a new position at which to display each of the one or more new other contents in relation to the new content of interest positioned at the origin, and wherein said display control means is configured to display the display images of said new content of interest and said one or more new other contents in accordance with the calculated new position.

13. The contents display device according to claim 1, further comprising:

accepting means configured to accept modification input to set a new content attribute as said coordinate axis;

wherein said contents selecting means is configured to obtain one or more new other contents relevant to said content of interest based on said new content attribute and the content identifier of said content of interest;

wherein the relation calculating means is configured to calculate a new strength of relationship between each of the one or more new other contents and the content of interest, and wherein said layout relation calculating means is configured to calculate, based on said new content attribute and said calculated new strength of relationship, a new position at which to display each of said one or more new other contents in relation to said content of interest positioned at the origin;

and wherein the display control means is configured to display on the display screen the display images of said content of interest and said one or more new other contents in accordance with the calculated new position.

14. A contents display method comprising:

storing metadata for a plurality of contents, the metadata including, for each content of the plurality of contents, at least data for generating a display image of the respective content, attribute data of the respective content, and correlation data indicating at least one correlation between the content and at least one other content of the plurality of contents, each correlation of the at least one correlation identifying a number of times that another content of the at least one other content was selected by one or more users following a selection of the content, wherein the metadata is stored to a metadata storage unit in a manner correlated with a content identifier of the respective content;

accepting user input to set a content attribute as a coordinate axis;

searching the metadata of said metadata storage unit, based on the content attribute and the content identifier of a predetermined content of interest of the plurality of contents, to select two or more other contents of the plurality of contents that relate to said content of interest according to the content attribute;

calculating, for each content of the two or more other contents, a strength of relationship between the content and said content of interest based on at least the content attribute and on correlation data indicating the number of times that the content was selected by the one or more users following selection of the content of interest;

calculating, based on said content attribute and said calculated strength of relationship, a position at which to display each of said two or more other contents in relation to said content of interest positioned at an origin, wherein a position closer to the origin is calculated for an other content having a strong relationship with the content of interest than for an other content having a weak relationship with the content of interest; and displaying on a display screen the display images of said two or more other contents concurrently, in accordance with said calculated position for each of the two or more other contents, while the display image of said content of interest is concurrently displayed on said origin.

15. A contents display device comprising:

a metadata storage unit configured to store metadata for a plurality of contents, the metadata including, for each content of the plurality of contents, at least data for generating a display image of the respective content, attribute data of the respective content, and correlation data indicating at least one correlation between the content and at least one other content of the plurality of contents, each correlation of the at least one correlation identifying a number of times that another content of the at least one other content was selected by one or more users following a selection of the content, wherein the metadata storage unit is configured to store the metadata in a manner correlated with a content identifier of the respective content;

an operation input unit configured to receive user input to set a content attribute as a coordinate axis;

a contents selecting unit configured to search the metadata of said metadata storage unit, based on the content attribute and the content identifier of a predetermined content of interest of the plurality of contents, to select two or more other contents of the plurality of contents that relate to said content of interest according to the content attribute;

a relation calculating unit configured to calculate, for each content of the two or more other contents, a strength of relationship between the content and said content of interest based on at least the content attribute and based on correlation data the number of times that the content was selected by the one or more users following selection of the content of interest;

a layout relation calculating unit configured to calculate, based on said content attribute and said calculated strength of relationship, a position at which to display each of said two or more other contents in relation to said content of interest positioned at an origin, wherein the layout relation calculating unit is configured to calculate a position closer to the origin for an other content having a strong relationship with the content of interest than for an other content having a weak relationship with the content of interest; and a display control unit configured to display on a display screen the display images of said two or more other contents concurrently, in accordance with said calculated position for each of the two or more other contents, while the display image of said content of interest is concurrently displayed on said origin.

* * * * *